(12) United States Patent
Nong

(10) Patent No.: US 11,130,382 B2
(45) Date of Patent: Sep. 28, 2021

(54) VEHICLE AND METHODS FOR IMPROVING STABILITY AND OCCUPANT COMFORT

(71) Applicant: Nimbus AV Limited Liability Company, Ann Arbor, MI (US)

(72) Inventor: Lihang Nong, Ann Arbor, MI (US)

(73) Assignee: Nimbus AV Limited Liability Company, Ann Arbor, MI (US)

(*) Notice: Subject to any disclaimer, the term of this patent is extended or adjusted under 35 U.S.C. 154(b) by 178 days.

(21) Appl. No.: 16/377,218

(22) Filed: Apr. 7, 2019

(65) Prior Publication Data

US 2020/0317018 A1 Oct. 8, 2020

Related U.S. Application Data

(60) Provisional application No. 62/654,326, filed on Apr. 7, 2018.

(51) Int. Cl.
| | |
|---|---|
| *B60G 17/0165* | (2006.01) |
| *B60W 30/02* | (2012.01) |
| *B60G 17/016* | (2006.01) |
| *G05D 1/02* | (2020.01) |
| *B60G 3/18* | (2006.01) |
| *B60G 3/20* | (2006.01) |

(52) U.S. Cl.
CPC ..... *B60G 17/0165* (2013.01); *B60G 17/0162* (2013.01); *B60W 30/02* (2013.01); *B60G 3/185* (2013.01); *B60G 3/207* (2013.01); *B60G 2200/13* (2013.01); *B60G 2200/132* (2013.01); *B60G 2400/0511* (2013.01); *B60G 2400/0512* (2013.01); *B60W 2520/16* (2013.01); *B60W 2520/18* (2013.01); *B60W 2710/22* (2013.01); *B60W 2720/16* (2013.01); *B60W 2720/18* (2013.01); *G05D 1/021* (2013.01)

(58) Field of Classification Search
None
See application file for complete search history.

(56) References Cited

U.S. PATENT DOCUMENTS

2013/0153311 A1* 6/2013 Huntzinger .............. B60K 7/00
180/55
2015/0224845 A1* 8/2015 Anderson ............ B60G 17/052
701/37

OTHER PUBLICATIONS

Hanlon, "Mercedes-Benz F 300 Life-Jet: the three-wheeled driving machine", Urban Transport, 2005, p. 1-3 (Year: 2005).*

(Continued)

*Primary Examiner* — Tamara L Weber
(74) *Attorney, Agent, or Firm* — Fideli Law PLLC

(57) ABSTRACT

The present disclosure relates to autonomous driving vehicles and methods for improving stability and occupant comfort of the same. The vehicle includes: a frame member; a cabin, movable with respect to and independent from the frame member; wheels; at least one suspension between the wheels and frame member; actuation device configured to control at least the orientation of the cabin with respect to the frame member; a perception module comprising perception sensors and algorithm configured to at least identify road boundaries and obstacles in the vicinity of the vehicle; and a planning module configured to plan the motions of the steering means using information from at least the perception module.

19 Claims, 14 Drawing Sheets

(56) References Cited

OTHER PUBLICATIONS

Vasilash, "The Future of Automotive Transportation", Automotive Design and Production, 2010, p. 18-19 (Year: 2010).*
Genta et al., "The Motor Car: Past, Present and Future", 2014, p. 556-558 (Year: 2014).*

* cited by examiner

VEHICLE AND METHODS FOR IMPROVING STABILITY AND OCCUPANT COMFORT

RELATED APPLICATION

This application is based upon and claims the benefit of U.S. Provisional Application No. 62/654,326, filed on Apr. 7, 2018, the entire contents of which are incorporated herein by reference.

TECHNICAL FIELD

The present disclosure generally relates to vehicles. Specifically, the present disclosure relates to autonomous driving vehicles and methods for improving stability and occupant comfort of the same.

BACKGROUND

Compared to other forms of ground transportation such as walking, biking, and public transportation, cars provide many advantages such as greater convenience, privacy, and comfort for its occupants. Self-driving technology in cars is expected to drastically reduce their cost of use which will further encourage more people to use cars. However, the increase in car usage is expected to increase congestion on roads unless car trips are shared between occupants. Sharing of cars diminish their advantages by making them less private and convenient.

Self-driving technology in cars will also enable the occupants to disengage from paying attention to the road and free to do other tasks such as reading, watching media, or working. It is known that a large percentage of the population are prone to motion sickness and other types of discomfort when they are inside a vehicle under motion.

Therefore, there is a need for a self-driving vehicle with a small physical footprint to reduce traffic congestion that can also provide a greater level of comfort for the occupants.

SUMMARY

According to one embodiment of the present application, a vehicle, vehicle components, and methods are provided to enhance vehicle stability and occupant comfort. The vehicle uses various sensing and actuation means to plan an optimal trajectory for the vehicle and control the heave, roll and pitch, and planar motions of the vehicle.

According to an aspect of the present disclosure, a vehicle may include a frame member; a cabin, movable with respect to and independent from the frame member; wheels; at least one suspension between the wheels and frame member; actuation device configured to control at least the orientation of the cabin with respect to the frame member; a perception module comprising perception sensors and algorithm configured to at least identify road boundaries and obstacles in the vicinity of the vehicle; and a planning module configured to plan the motions of the steering means using information from at least the perception module.

The planning module is configured to plan the motions of the actuation means using information from at least the perception module. The actuation means adjust the roll angle of cabin to reduce the lateral accelerations measured at the cabin. The actuation means adjust the pitch angle of the cabin to reduce the longitudinal accelerations measured at the cabin. The actuation means adjust the heave motion of the cabin to reduce the vertical accelerations measured at the cabin. The actuation means respond at least in part to cabin orientation measurement. The actuation means respond at least in part to suspension travel measurement. The movement of the actuation means depends at least in part on the estimated mass of the cabin and its contents. The cabin is supported such that no electrical power is required to hold its static position.

According to another aspect of the present disclosure, a vehicle may include: a frame member; a cabin; two or more wheels arranged with a lateral distance between at least some of the wheels; wheel height actuation means configured to control the height between the wheels and frame member; steering means other than the wheel height actuation means; a perception module comprising perception sensors and algorithm configured to at least identify road boundaries and obstacles in the vicinity of the vehicle; a planning module configured to plan at least the lateral motion of the vehicle using information from at least the perception module; and the motion of the steering means opposes the steering effect from the motion of the wheel height actuation means during planned lateral motion of the vehicle.

The steering means opposes the steering effect from the motion of the wheel height actuation means during an initial portion of the lateral motion of the vehicle. The steering means aids the steering effect from the motion of the wheel height actuation means during a subsequent portion of the lateral motion of the vehicle. The actuation means are configured to move the cabin with respect to the frame member. The actuation means move the cabin according to at least the movement of the wheels with respect to the frame member. The wheel height actuation means adjust the roll angle of cabin to reduce the lateral accelerations measured at the cabin. The wheel height actuation means adjust the pitch angle of cabin to reduce the longitudinal accelerations measured at the cabin. The wheel height actuation means adjust the heave motion of the cabin to reduce the vertical accelerations measured at the cabin. The movement of the wheel height actuation means depends at least in part on the estimated mass of the vehicle. The movement of the steering means depends at least in part on the estimated mass of the vehicle. The cabin is attached to the frame via compliant mounts.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
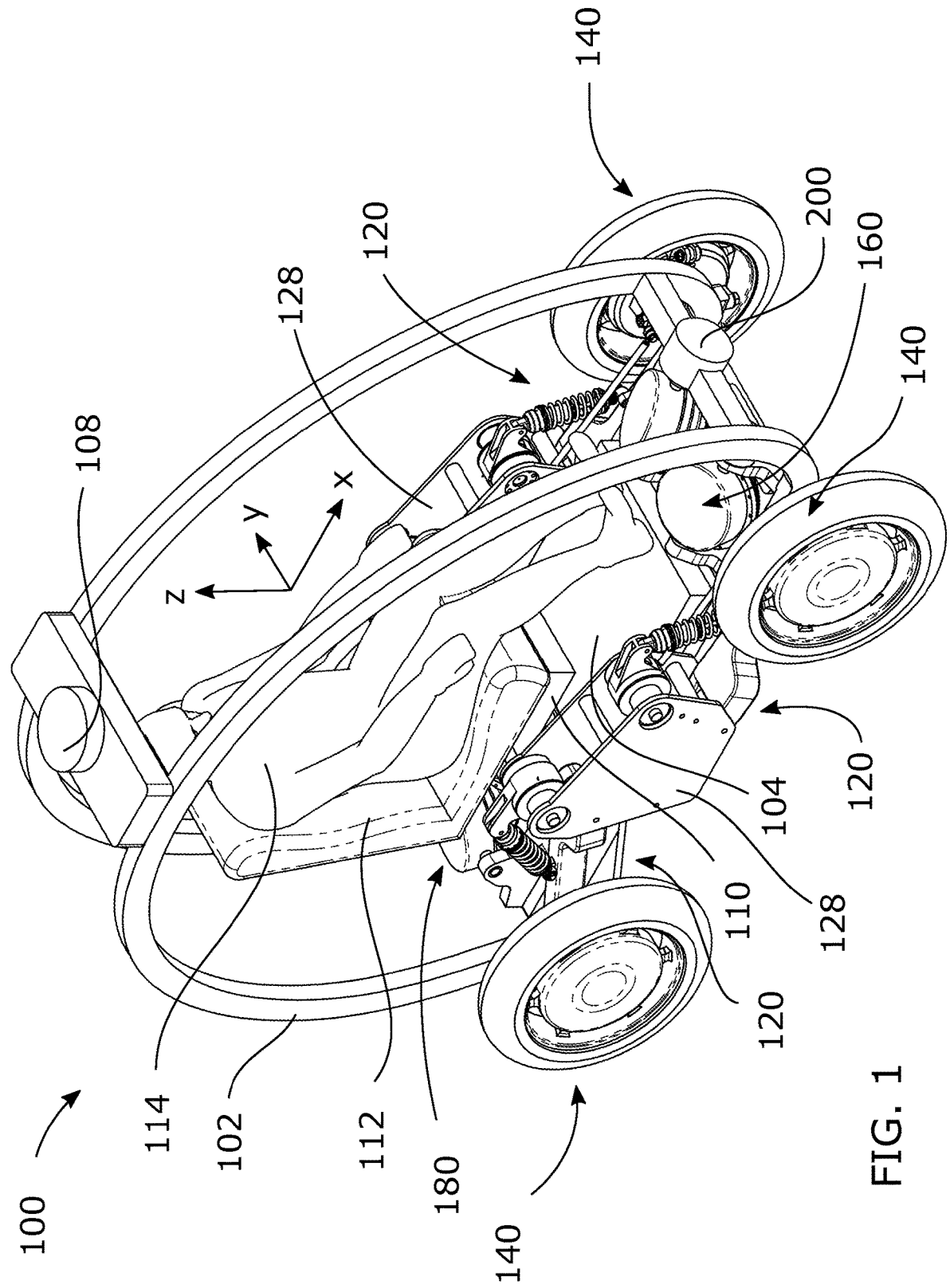
FIG. 1 is a perspective view of a vehicle in accordance with various embodiments of the present application in a first mode of operation.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may or may not be implemented in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to cars, it should also be understood that this is only an implementation example. The system or method of the present disclosure may be applied to any other kind of moving platforms, such as trains and ships, etc.

Figure 2:
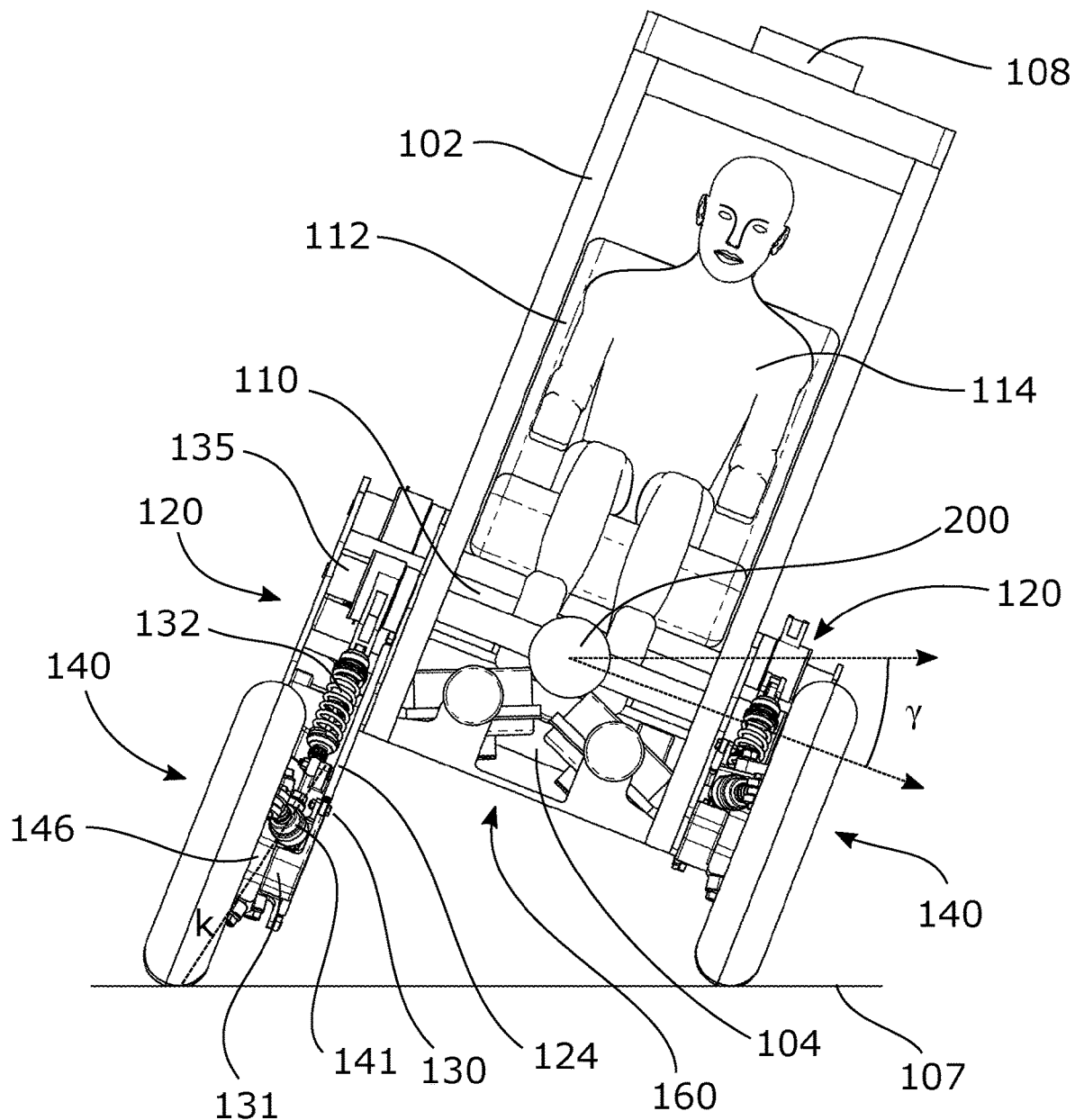
FIG. 2 is a frontal view of the vehicle in FIG. 1 in a second mode of operation.
Figure 3:
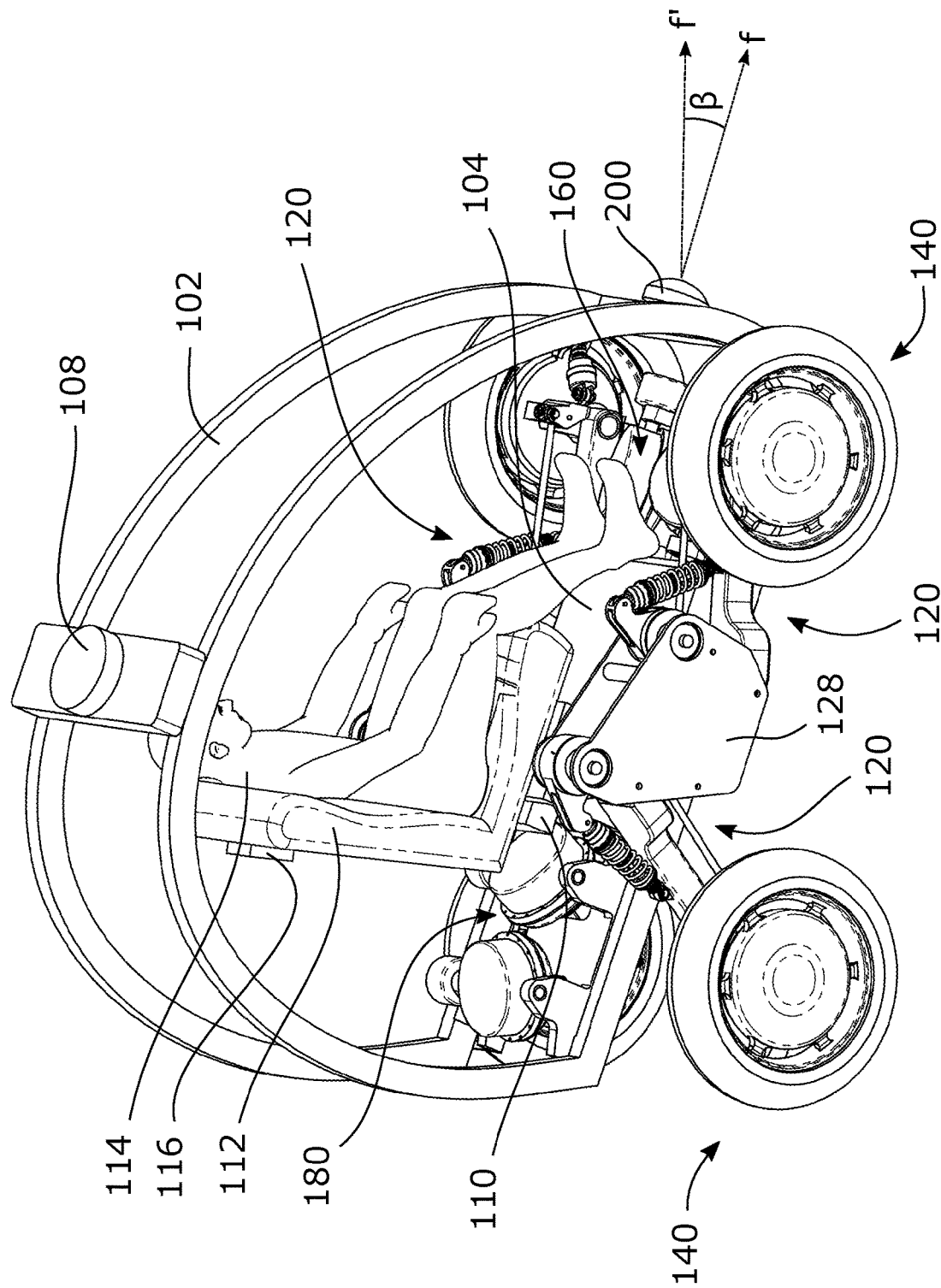
FIG. 3 is a perspective view of the vehicle in FIG. 1 in a third mode of operation.

Shown in FIGS. 1-3 according to exemplary embodiments is a vehicle 100 which may include a vehicle frame. One or more suspension control assemblies may be mounted on the vehicle frame. On each suspension control assembly there may be a spring and damper member attached between the vehicle frame on one end and a suspension link on the other end via an attachment point, so that vibrations transmitted from the road towards the vehicle frame may be effectively reduced.

The vehicle 100 may also include a frame member 102 mounted on the suspension, a battery 104 attached to said frame member, a first sensing assembly 200 at the front of the vehicle, a second sensing assembly 108 at the top of the vehicle, a control module 110, a seat 112 attached to said frame member 102 which may seat an occupant 114, an inertial measurement unit (IMU) 116 attached to said seat, four suspension control assemblies 120, four wheel control assemblies 140, and a pitch gyrostabilizer assembly 160 and a roll gyrostabilizer assembly 180 attached to the frame member 102. The vehicle-referenced coordinate frame may be defined by a longitudinal or roll axis x, lateral or pitch axis y, and a vertical or yaw axis z. The vehicle 100 may be driven on a road surface 107. Vehicle motion along the road surface 107 which may include translational motion in the axis x and axis y and rotation around the yaw axis z will be herein referred to as planar motion. The four suspension control assemblies 120 may be affixed to the frame member 102 via a subframe 128. The wheel control assemblies 140 may be affixed to each of the four suspension control assemblies 120.

A suspension control module may be employed by the vehicle 100 and electronically connected to the suspension control assemblies 120. During operation, the suspension control module may send command/instruction/electronic signals to actuators of the suspension control assemblies 120, which may accordingly change the attitude of the vehicle. The suspension control module may also control the suspension control assemblies 120 to change the vertical road forces at the wheels of the vehicle 100. The suspension control assemblies 120 may also be configured to displace the attachment points between the suspension and the damper members upon commands and/or instructions from the suspension control module. The wheel control assemblies 140 may be configured to control the longitudinal and lateral road forces at the wheels by providing braking forces from commands by a brake control module, acceleration forces from commands by a motor wheel control module, and lateral forces from commands by a wheel angle control module, wherein the wheel angle control module may control the angles of the wheels in the z axis with respect to the vehicle. The gyrostabilizer assemblies 160 and 180 may be configured to generate control moments to control the attitude of the vehicle about the pitch and roll axis y and x.

Figure 6:
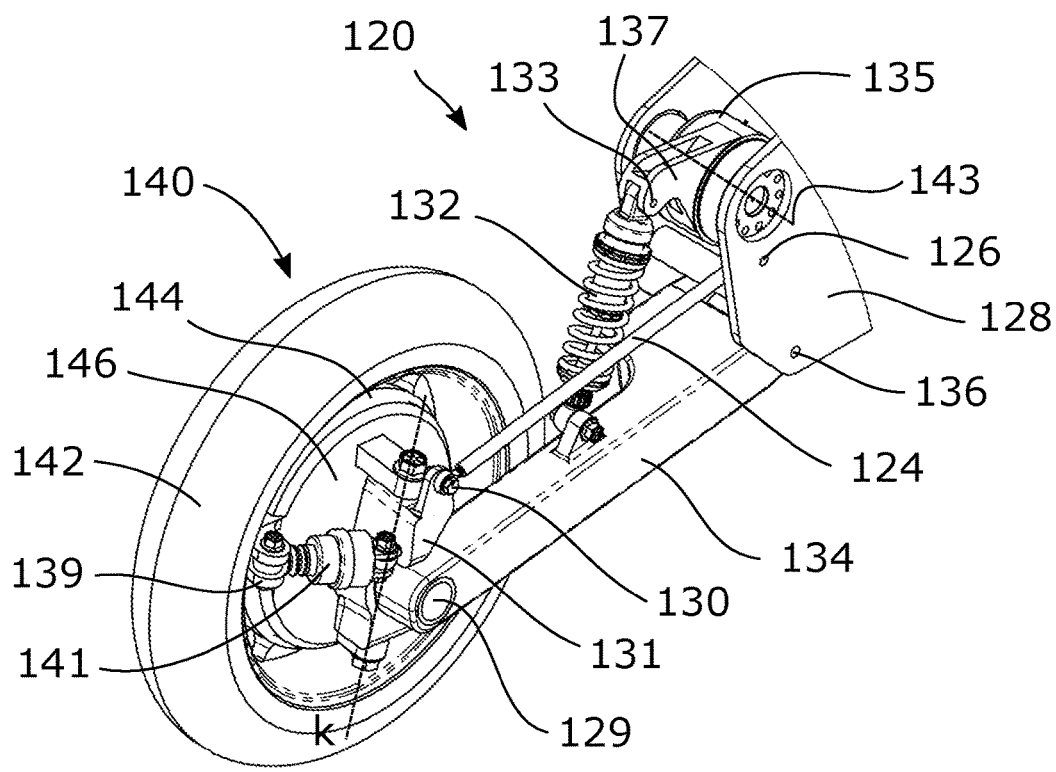
FIG. 6 is a perspective view of a suspension control assembly in accordance with various embodiments of the present application.

Each suspension control assembly 120 shown in detail in FIG. 6 may include an upper link 124 and a lower link 134. The upper link 124 may include a first end and a second end.

Further, the upper link 124 may attach to a pivot 126 on the subframe 128 on the first end; and may attach to a pivot 130 on an upright 131 on the second end. The lower link 134 may include a first end and a second end. Further, the lower link 134 may attach to a pivot 136 on the subframe 128 on the first end; and may attach to a pivot 129 on the upright 131 on the second end. The suspension control assembly 120 may further include a suspension actuator 135 attached to the subframe 128 on one end and to a pivot 133 on a spring and damper member 132 via an arm 137 on a second end. The suspension actuator 135 may be configured so that the pivot 133 of the spring and damper member 132 can be moved relative to the subframe 128 when the arm 137 rotates about axis 143. The suspension actuator 135 of each of the suspension control assemblies 120 may be controlled to change the pitch and roll of the vehicle 100, e.g., in response to road disturbances and aerodynamic disturbances, to improve comfort for the occupant 114. The spring and damper member 132 may have a damping rate that may be controlled by the control module 110. The damping rate may be controlled by a solenoid inside the damper (e.g., the damper member 132) that may interact with a magnetorheological damper fluid or damper fluid control valve. The virtual pivot points of the front and rear suspension are may be located to provide desirable anti-squat and anti-dive characteristics. The virtual pivot points of the wheels may also allow the wheels to move backwards while upwards which is known to enhance ride comfort.

The spring and damper member 132 may be attached to the arm 137 on one end and either the upper link 124 or lower link 134 on the other end, depending on whether the suspension control assembly 120 is on the rear or front of the vehicle 100. When the suspension assembly 120 is located on the front of the vehicle 100, the spring and damper member 132 may be attached to the arm 137 on one end and the lower link 134 on the other end. When the suspension assembly 120 is located on the rear of the vehicle 100, the spring and damper member 132 may be attached to the arm 137 on one end and the upper link on the other end. The suspension actuator 135 may also have a servo motor which may be coupled to a gear reducer and a brake with a first rotation sensor (not shown). A second rotation sensor (not shown) may detect rotation between the upper link 124 or lower link 134 and the subframe 128. The movement of the wheel with respect to the sprung mass may be derived using the second rotation sensor while the compression of the spring and damper member 132 may be calculated from the first and second rotation sensor. The brake in the suspension actuator 135 may use a spring to keep the bake locked so that no power is used to keep each suspension control assembly 120 at a desired height when the actuator is not rotating. The gear reducer may be a high efficiency harmonic drive which may allow the servo motor in the suspension actuator 135 to be back-driven (e.g., switching from a motor to an electric generator) and may generate electrical power using external energy inputted to the servo motor, such as when the suspension is subject to road forces. In other embodiments, other means of limiting power consumption of the suspension actuator 135 when it is not actuated may be employed by the suspension actuator 135 or with the brake such as a hard stop limit or the use of a high friction gear reducer which cannot be back-driven and therefore does not require power to remain in a certain position. Each of the four suspension control assemblies 120 may generally function similarly but have different dimensions and orientations of the components due to for example the different physical demands at each wheel such as instantaneous center of rotation of the wheels, trail, weight distribution, etc. The exemplary suspension control assembly 120 is shown to have a suspension actuator 135 which produces a force in series with the spring and damper member 132. According to other embodiments, the suspension control assembly 120 may include a suspension actuator that produces a force in parallel with a spring and damper member so that the power consumption of the suspension actuator can be limited without the use of a brake.

The vehicle 100 in FIG. 1 may have a level attitude with respect to the road which may be an operational mode when for example the vehicle 100 is traveling on a smooth road heading in a forward direction without longitudinal acceleration (e.g., an acceleration along the forward direction). The vehicle 100 in FIG. 2 is shown undergoing a roll motion about the negative x direction which may be an operational mode for example when vehicle 100 is encountering lateral acceleration in the negative y direction and the roll motion may reduce the perceived lateral acceleration by the occupant 114. The vehicle 100 in FIG. 3 is shown undergoing a pitch motion about the positive y direction which may be an operational mode for example when the vehicle 100 is traveling uphill or undergoing positive x axis acceleration and the pitch motion may reduce the perceived longitudinal acceleration by the occupant 114.

The wheel control assembly 140 shown in detail in FIG. 6 may include a pneumatic tire 142 which may be mounted on a motor wheel 144 which may include a wheel rim attached to a motor capable of accelerating the vehicle 100 at a desired rate. The motor wheel 144 may be rotatably supported along its axis of symmetry by a stator hub 146 which may be pivotably supported by the upright 131 along the kingpin axis k. A steering actuator 141 may be attached to the upright 131 on a first end and an arm 139 on the stator hub 146 on a second end with spherical joints. The steering actuator 141 may be a linear actuator such that when lengthened or shortened rotates the stator hub 146 via arm 139 about kingpin axis k to change the steering angle of the motor wheel 144. The steering actuator 141 may use a rotary servo motor coupled to a ballscrew mechanism and electromagnetic brake to provide linear motion. The motor wheel 144 may have sensing means (not shown) to measure its rotation about its axis of symmetry with respect to the stator hub 146 to provide odometry information. A braking means such as an internal drum brake or external disk brake (not pictured) may be employed between the motor wheel 144 and the stator hub 146 or upright 131 that may be controlled by a brake control module. The brake is capable of being pulsed and modulated to reduce skidding under low traction conditions.

The kingpin axis k may be inclined with respect to the vertical when viewed from the front of the vehicle 100 in order to reduce the force on the steering actuator 141 when the wheel experiences a longitudinal force. The kingpin axis k may be inclined with respect to the vertical when viewed from the side of the vehicle 100 (x-z plane) to provide a positive mechanical trail which tends to stabilize the vehicle. The upper link 124 and lower link 134 may be close to the same length to allow the orientation of the kingpin axis k to remain relatively unchanged with respect to the frame member 102 when the motor wheel 144 is displaced as the spring and damper member 132 is compressed and/or during activation of the suspension actuator 135. The relatively unchanged orientation of the kingpin axis k may reduce the change in wheel camber, trail, and steering angle as the motor wheel 144 is displaced which may make the vehicle 100 more stable and simpler to control.

Figure 4:
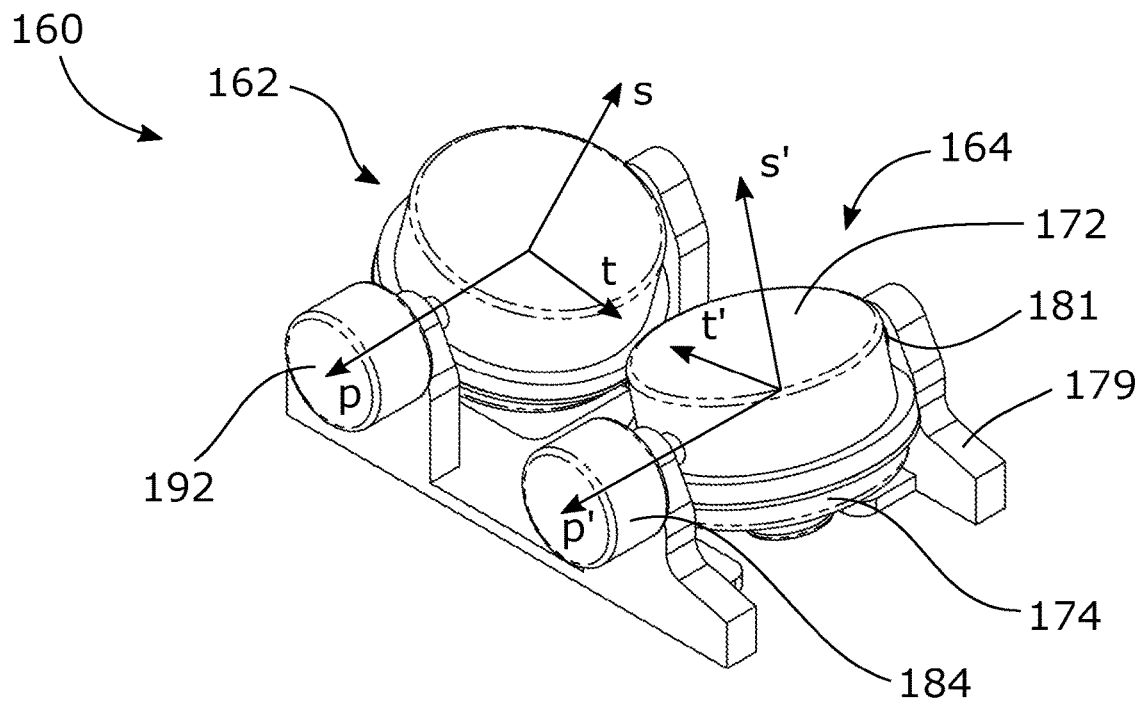
FIG. 4 is a perspective view of a gyrostabilizer assembly in accordance with various embodiments of the present application.
Figure 5:
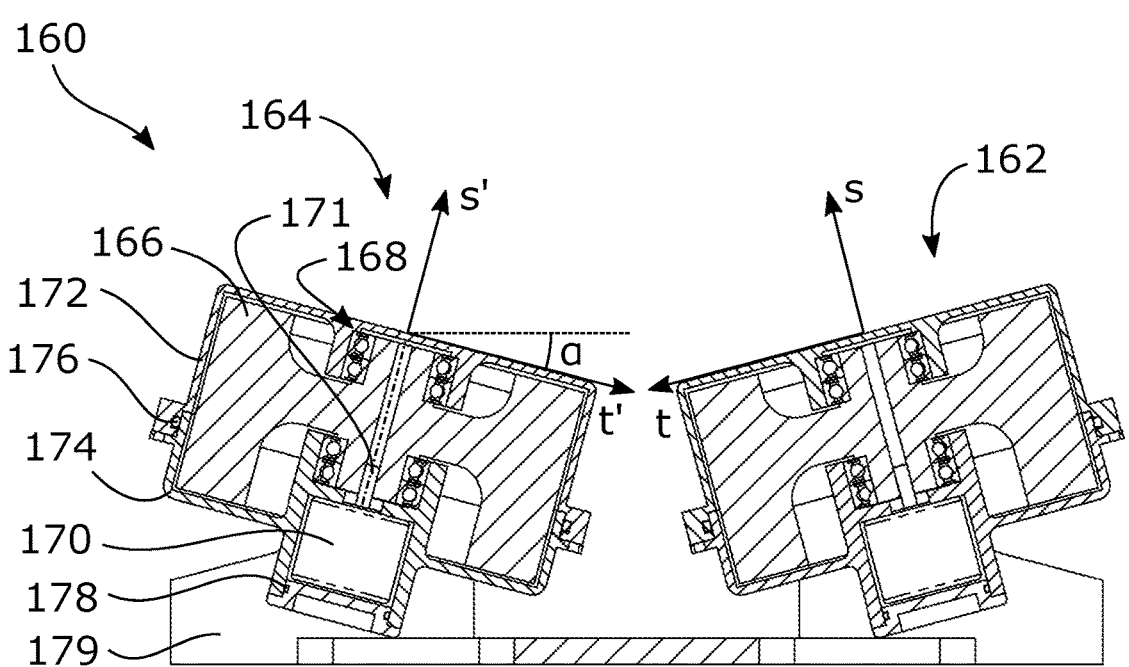
FIG. 5 is a cross sectional view of the gyrostabilizer assembly of FIGS. 4.

The gyrostabilizer assembly 160 is shown in detail in FIGS. 4-5. The gyrostabilizer assemblies 160 and 180 according to the exemplary embodiments may be similar except their orientation relative to the vehicle 100. The gyrostabilizer assembly 160 may include a first flywheel assembly 162 and a second flywheel assembly 164 which may be structurally similar and only one is described in detail. The flywheel assembly 164 may have a flywheel 166 supported by spin bearings 168, a spin motor 170, an upper housing 172, a lower housing 174, a first O-ring 176, a second O-ring 178, and may be pivotably supported by a stabilizing frame 179 through precession bearings 181 along precession axis p'. The flywheel 166 may be pivotably supported by the spin bearings 168 about spin axis s' and rotated by spin motor 170 via the motor shaft 171. The motor shaft 171 and flywheel 166 may be coupled to prevent relative rotation about axis s'. The flywheel assemblies 162 and 164 may be controlled to rotate along their own precession axis p and p' (precess) by their own precession actuators 192 and 184.

Each of the precession actuators 184 and 192 may have a servo, a brake, and a rotation sensor (not shown). When the flywheel assemblies 162 and 164 are precessed along axis p and p' with the precession actuators, torque may be generated about their own torque axis t and t' and transferred to the vehicle frame member 102 via the precession bearings 181 and stabilizing frame 179 which is attached to the vehicle frame member 102. The precession axis p and p' may be orthogonal to the spin axis s and s', respectively. The gyrostabilizer assembly 160 may be oriented so that the generated torque is aligned with the pitch axis of the vehicle to provide pitch attitude control. The gyrostabilizer assembly 180 may be oriented so that the generated torque is aligned with the roll axis of the vehicle to provide roll attitude control. The flywheels in the flywheel assembly 162 and 164 may be counter-rotating and the direction of precession may be in opposite directions (counter-precessing) so that the components of torque generated about the z axis are cancelled. The precession rates of the flywheel assemblies 162 and 164 may be controlled actively by the precession actuators 184 and 192 to provide desired pitch and roll response of the vehicle 100 which may include in certain modes of operation using a brake to slow or stop the rate of precession to limit the torque generated and include in other modes using the electromagnetic actuators to precess the flywheel assemblies 162 and 164 at a specified rate and direction. The center of mass of the flywheel assemblies 162 and 164 may be below the precession axis p and p' so that the precession angle α tends to drift to zero from the force of gravity which may allow for the torque axis to be aligned with the roll axis x or pitch axis y of the vehicle. The angle of precession of the flywheel assemblies 162 and 164 may be linked electronically in one embodiment and by mechanical means such as gears in another embodiment so that the counter-precession are synchronized, and the yaw moments are cancelled out. In other embodiments, the precession of the flywheel assemblies 162 and 164 may be separately controlled to provide additional control of the vehicle 100 along the yaw axis z. In other embodiments, a single flywheel assembly may be used for each gyrostabilizer assembly. The use of a single flywheel assembly may generate torque in the yaw axis z of the vehicle when the precession angle α is non-zero which is tolerable if the precession angle α is kept sufficiently small and the vehicle is sufficiently resistant to yaw moments. In other embodiments, only one of the gyrostabilizer assemblies 160 or 180 may be used for roll or pitch stabilization of the vehicle 100 for certain suitable geometric configurations of the vehicle 100. For example, if the trackwidth of the vehicle is sufficiently large compared to the wheelbase, it may be sufficient to use only pitch stabilization. Conversely, if the wheelbase of the vehicle is sufficiently large compared to the trackwidth, it may be sufficient to use only roll stabilization.

According to the exemplary embodiments, a first O-ring 176 and second O-ring 178 may seal the flywheel 166, spin bearings 168, and spin motor 170 inside the upper housing 172 and lower housing 174, providing a vacuum chamber. The vacuum chamber may reduce the power consumption of the spin motor 170 by reducing air friction. The flywheel 166 may have a shape which concentrates more mass around its outer circumference which provides a greater polar moment of inertia around the spin axis which provides more control moment for the same total flywheel mass. The flywheel 166 may have a large radius on its inside corner to prevent debris from getting stuck there which can unbalance the flywheel 166 and lead to premature failure of the spin bearings 168. The torque and RPM of the spin motor 170 may be monitored for faults in the flywheel assembly 162 and 164. If the average torque requirement of the spin motor 170 exceeds a threshold, the gyrostabilizer assembly may be checked for possible failure of the spin bearings 168. The RPM of the spin motor 170 may be monitored to estimate the amount of control torque produced. The value of the torque $\pi_t$ produced along the torque axis t by the flywheel assembly 162 comprising of a flywheel 166 with a polar moment of inertia Is and angular velocity $\omega_s$ both about the spin axis s, a precession rate α about the precession axis p, and a precession angle α may be determined by the gyrostabilizer control module using the following formula:

$$\pi_t = \omega_s I_s \alpha \cos \alpha$$

In another embodiment, the precession actuators 184 and 192 may not have an actuator capable of precessing the flywheel assemblies 162 and 164 along their precession axis p and p'. When the brake in a precession actuator is released and there is a rotational velocity of the vehicle 100 about the torque axis, the associated flywheel assembly may incur a natural precession rate and generate a torque along its torque axis to counter any rotational velocity in the torque axis. This method of passive gyro stabilization may not potentially control the roll or pitch response of the vehicle as well as using a servo actuator to precess the flywheels. However, the complexity and cost of the system may be lower for this limited control embodiment and its performance may be adequate for certain modes of operation such as rollover prevention and certain vehicle embodiments.

In another embodiment, the spin motor 170 may be used as a generator to extract kinetic energy from the flywheel 166 and turn into electrical energy to use during high acceleration demands or to stop the flywheels when the vehicle does not require active or passive gyro stabilization such as when there is no occupant 114. The spin motor 170 may also be used to increase the spin speed of the flywheel 166 when excess power needs to be dumped by the vehicle more than the batteries can absorb such as during hard vehicle regenerative braking.

Figure 7:
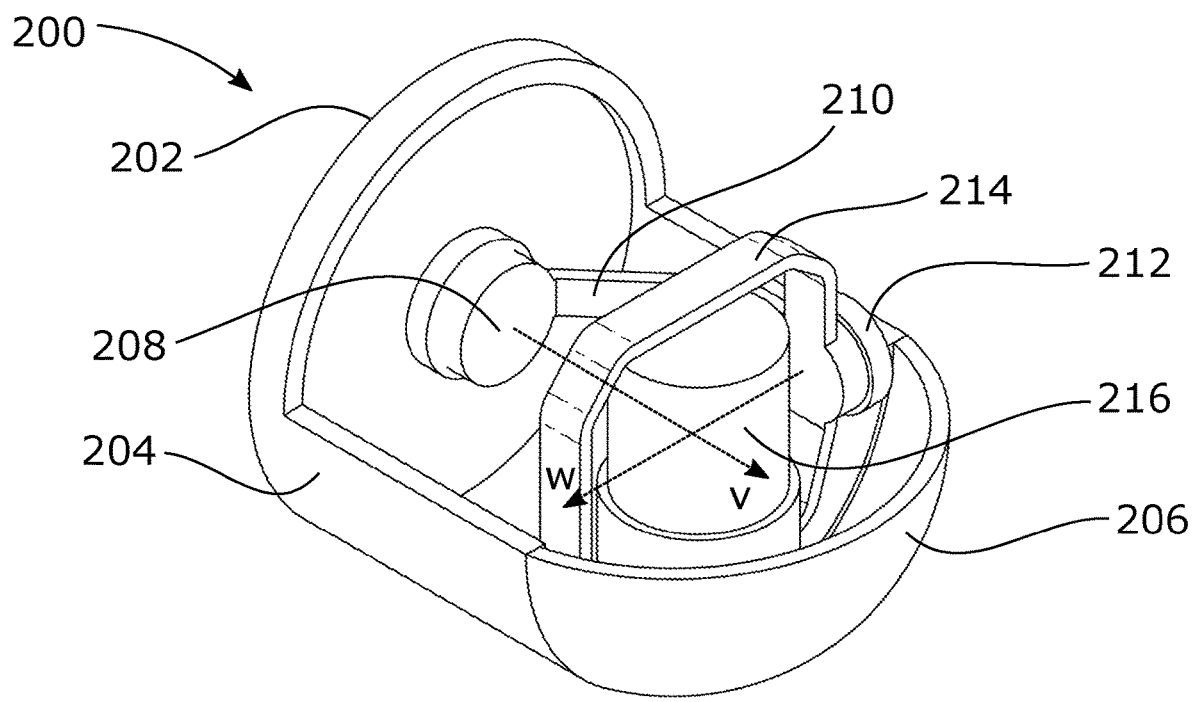
FIG. 7 is a perspective sectional view of a sensing assembly in accordance with various embodiments of the present application.

A sensing assembly 200 according to exemplary embodiments is shown in FIG. 7. The sensing assembly 200 may include a base 202 which may be affixed to the frame of a vehicle such as frame member 102 of vehicle 100, a housing 204, and a round viewing port 206. Fixed to the housing 204 may be a first rotation actuator 208 which may be configured to rotate a first rotation arm 210 on its first end about axis v. The first rotation arm 210 may be affixed on its second end to a second rotation actuator 212 which may be configured to rotate a second rotation arm 214 about axis w. A sensor package 216 which may contain at least some of the sensors used for the vehicle perception and localization module may be affixed to the second rotation arm 214. The first rotation actuator 208 and second rotation actuator 212 may be configured to rotate the sensor package 216 about axis v and w to change its orientation with respect to the base 202.

The rotation actuators 208 and 212 may actively control the orientation of the sensor package 216 so that it maintains an ideal orientation with respect to the road. The axis v may be aligned with the x axis of the vehicle 100 and the axis w may be aligned with the y axis of the vehicle. A sensor package with its orientation fixed to a vehicle that is undergoing a high amount of attitude control may have its field of view reduced substantially because of a portion of the beam of the sensor will not be pointed in an ideal direction. The sensing assembly 200 may maintain the orientation of the sensor package 216 to the road so that its field of view is not adversely affected by a high amount of attitude control.

For example, the vehicle 100 shown in the mode of operation in FIG. 3 may have a high amount of controlled pitching motion with respect to the road which is a mode of operation during high longitudinal acceleration or driving up a hill. The sensing direction of a sensor package fixed to the frame member 102 may be represented by axis f which has a reduced range. In the sensing assembly 200, the second rotation actuator 212 may adjust the orientation of the actuator package 216 about axis w by a rotation angle of β so that the sensing direction f' of the sensor package 216 is substantially parallel with the road. The vehicle 100 shown in the mode of operation in FIG. 2 may have a high amount of controlled roll motion with respect to the road which is a mode of operation during high lateral acceleration or traversing on a road with a large cross slope. The first rotation sensor 208 may rotate the sensor package along axis v by angle γ so that sensing direction is substantially parallel with the road. The orientation of the base 202 with respect to the road may be determined through the sensing means on each of the suspension control assemblies or accelerometers from for example an inertia measurement unit.

The viewing port 206 may be constructed out of a material to allow signals to and from the sensor package 216 to pass through such as a transparent plastic. The viewing port 206 may form part of a sphere and sensor package 216 may be located near its center so that any effect the viewing port 206 has on the signals to and from the sensor package 216 is directionally equal. The center of the sensor package 216 may be located near the axis v and w so that there is minimal translation of the sensor package 216 as its orientation is controlled. In another embodiment, a third rotation actuator (not shown) may be used to rotate the sensor package about the vehicle's z axis to for example look ahead of the curve while turning or rotated at a fast pace to scan a sensor with a narrow static width of view to resolve a larger sensing area.

In another embodiment, the adjustment of the orientation of the senor package 216 may be done passively by locating the center of gravity of the sensor package 216 below the axis v and axis w and using a damper in each axis to prevent excessive oscillation of the sensor package 216. In another embodiment, the senor package 216 may further include a spinning component (for example as part of a scanning sensor) on the inside with its spin axis orthogonal to axis u and axis w so that it tends to remain in the same orientation through gyroscopic effects which is also aided by a center of gravity below the axis v and w. In other embodiments, the sensing assembly 200 may not have means of changing the orientation of the sensor package 216 with respect to the base 202. Instead, the sensor package 216 may have a sufficient field of view to account for the reduction in viewing window when the vehicle which uses the sensing assembly 200 has a significant change in attitude.

The control module 110 may contain controllers for various actuators and motors on the vehicle 100 such as the precession actuators 192 of the gyrostabilizer assemblies 160 and 180, the spin motors 170, the motor wheels 144, the steering actuators 141, the brakes for the each motor wheel, and receiving means from a number of sensors including a first sensing assembly 200, second sensing assembly 108, suspension control assembly displacement sensors, and the inertial measurement unit 116. The control module 110 may contain an autonomous driving module which may provide vehicle planning. The inertial measurement unit 116 may contain sensors which can detect the orientation of the vehicle 100 with respect to the Earth, accelerations, and rotation of the vehicle 100 in the roll axis x, pitch axis y, and yaw axis z. The battery 104 may provide energy for the actuators, sensors, and controllers of the vehicle. The heavy components such as the battery 104 and gyrostabilizer assemblies 160 and 180 may be located low in z-axis height in the vehicle 100 to lower its center of gravity for greater stability and located near the wheels to increase the pitch and roll moments of inertia of the vehicle 100.

Figure 8:
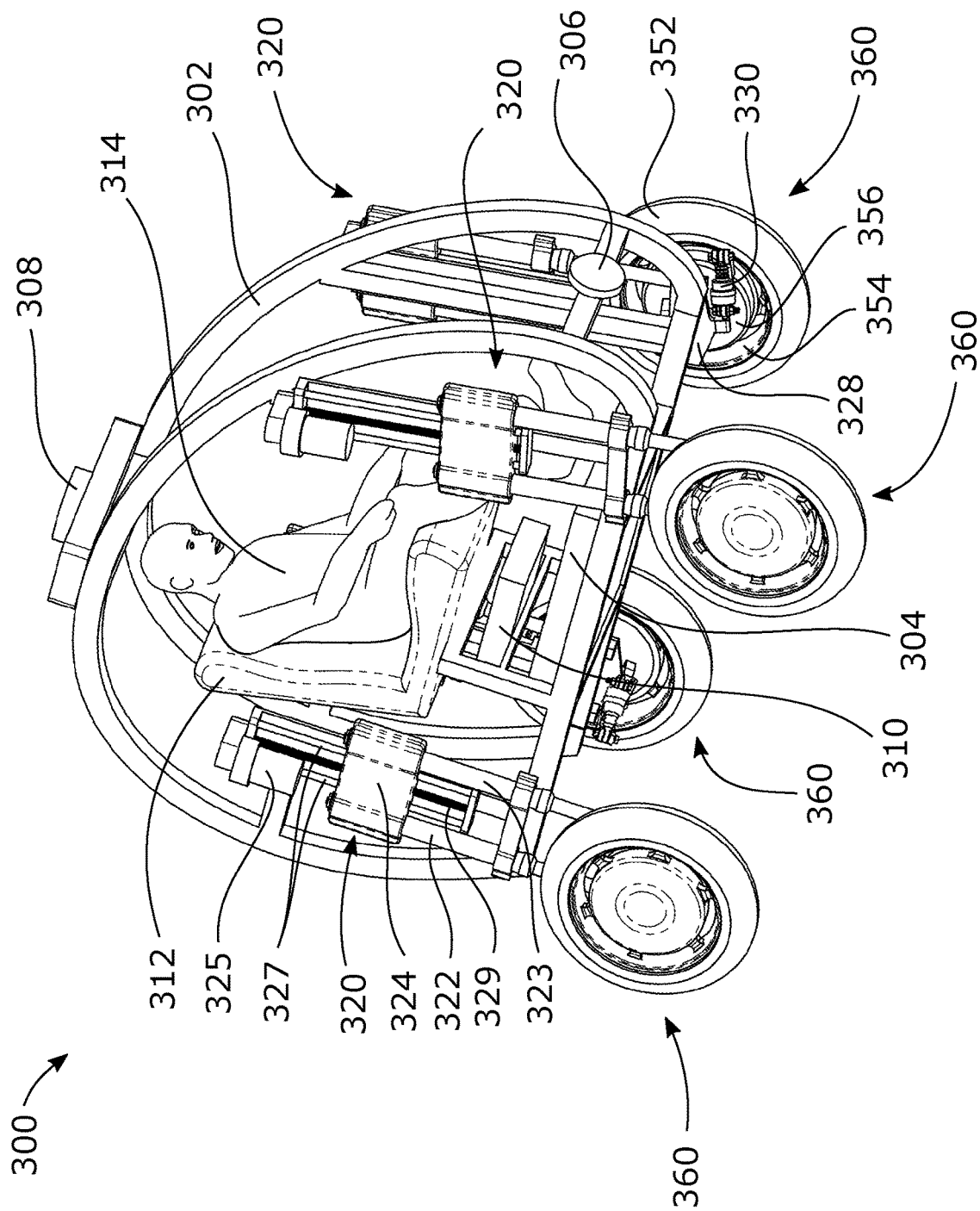
FIG. 8 is a perspective view of a vehicle in accordance with various embodiments of the present application.

Shown in FIG. 8 is a vehicle 300 according to another embodiment during a roll control motion. The vehicle 300 may have a frame member 302, a battery 304 attached to said frame member, a first sensing assembly 306 at the front of the vehicle, a second sensing assembly 308 at the top of the vehicle, a control module 310, a seat 312 attached to said frame member which may seat an occupant 314, an inertial measurement unit (not shown), four suspension control assemblies 320 and wheel control assemblies 360. Each suspension control assembly 320 may include a first suspension fork 322 and second suspension fork 323 which may be both on one end attached to a carriage 324 and a support member 328 on a second end. The carriage 324 may be controlled by a linear motion mechanism including ballscrew 329 coupled to a suspension actuator 325. The suspension control assembly 320 may be attached to the frame member 302 and may have a linear sensor (not shown) to detect motion of the suspension actuator 325 with respect to the frame member 302 and have a brake (not shown) used to limit power consumption when the suspension actuator 325 is not in motion. A second linear sensor (not shown) may detect linear motion between the carriage 324 and the motor wheel 354. Support guides 327 attached to the frame member 302 may slidably support the carriage 324. The motor and drive assembly 350 may include a pneumatic tire 352 which is mounted on a motor wheel 354. The motor wheel 354 may be rotatably supported along its axis of symmetry by a stator hub 356 which may be pivotably supported by the support member 328 along a kingpin axis (not shown). A steering actuator 330 may be attached to the support member 328 on a first end and the stator hub 356 on a second end with spherical joints.

Compared to the suspension control assembly 120 of vehicle 100, the suspension control assembly 320 of vehicle 300 may use a suspension actuator that changes the attachment point of the suspension member in a linear instead of rotary motion which provides less change in the vehicle's wheelbase and/or trackwidth and spring and damper force characteristics. However, the space required for the assembly to provide the same suspension travel may be increased for a linear actuator compared to a rotary actuator. Additionally, the fork type suspension of vehicle 300 may increase friction compared to the rotational linkage type suspension of vehicle 100. Otherwise, the suspension control assembly 320 may integrate with the remainder of the vehicle 300 in a manner similarly to suspension control assembly 120 integrates with vehicle 100. In other embodiments, the first suspension fork 322 and second suspension fork 323 may be replaced by a different type of suspension such as a McPherson-type, double wishbone, leading or trailing arm so that the adjustment in suspension is linear but the suspension travel motion uses pivoting linkages which is known to reduce friction compared to suspension forks.

Figure 9:
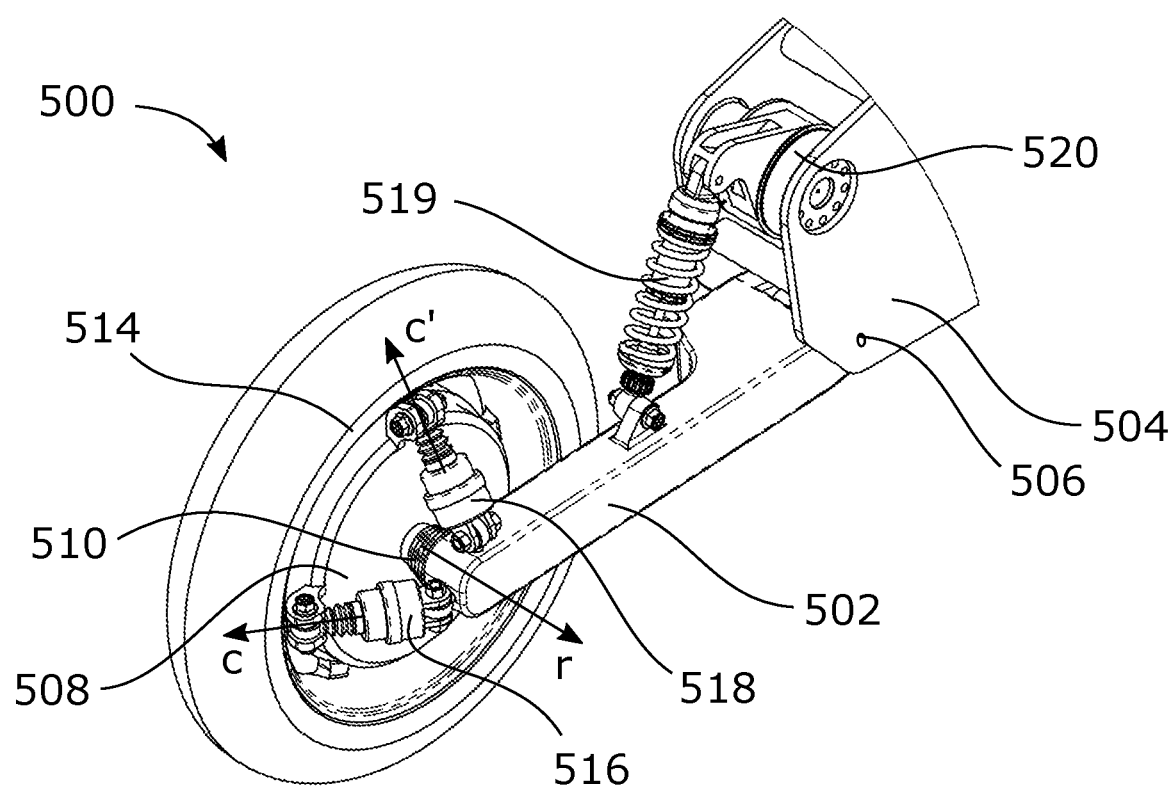
FIG. 9 is a perspective view of a suspension control assembly in accordance with various embodiments of the present application.

Shown in FIG. 9 is a suspension control assembly 500 according to other exemplary embodiments. The suspension control assembly 500 may use a swingarm 502 attached to a subframe 504 via a pivot 506. A stator hub 508 may be coupled to the swingarm 502 with a constant velocity joint 510, which allows the stator hub 508 to rotate/adjust its orientation with respect to the swingarm 502 and/or the constant velocity joint 510 about any direction except axis r in FIG. 9, the axis r is an axis perpendicular to the swingarm 502 and the stator hub 508 and passes through the constant velocity joint 510. The stator may not rotate around the r axis. Accordingly, the constant velocity joint 510 may further assume the torque from the motor wheel 514 when the vehicle accelerates and deaccelerates, i.e., the constant velocity joint 510 may allow the swingarm 502 to resist torque from the motor wheel 514 during longitudinal acceleration and braking. A first steering actuator 516 and second steering actuator 518 may be respectively pivotably attached to the swingarm 502 (e.g., via the hinge as shown in FIG. 9) on one end and the stator hub 508 (e.g., via the hinge as shown in FIG. 9) on the other end. Each of the hinges may include one or more spherical joints and rubber bushings to prevent binding of the actuators. The angle of actuation of the first steering actuator 516 and second steering actuator 518 may have directions of travel c and c' close to and/or substantially orthogonal to each other. The first steering actuator 516 may change its length (longer or shorter) during actuation; and the length of the second steering actuator 518 may change its length (e.g., longer or shorter) during actuation. By independently and respectively actuating the first steering actuator 516 and the second steering actuator 518, the orientation of the stator hub 508 may be adjusted with respect to the swingarm 502 and/or the constant velocity joint 510, thereby adjusting the orientation of the wheel. Both the first steering actuator 516 and second steering actuator 518 may contain internal brakes (not shown) to lock the positions of the actuators (e.g., the length of the actuators) without significant energy requirement. When the swingarm 502 rotates about pivot 506 during the activation of the spring and damper member 519 and/or the suspension actuator 520, the steering and camber angles of the wheels for non-zero initial steering and camber angles may change due to the change of the orientations of the axis c and c' with respect to the subframe 504. During rotation of the swingarm 502 about pivot 506, the first steering actuator 516 and second steering actuator 518 may work together to adjust the yaw and camber angles so that they remain constant or the desired value as determined by the suspension control module.

A rotation sensor (not shown) between the swingarm 502 and subframe 504 may provide information to the suspension control module and additional control modules about the correct adjustments from the steering actuators 516 and 518 when the swingarm 502 moves relative to the subframe 504. The adjustments of the steering actuators may allow a simpler mechanical linkage between the subframe 504 and the stator hub 508 in the exemplary embodiments. In other embodiments, suspension control assembly 500 may use a linkage mechanism like the one used in the suspension control assembly 120 to provide a constant orientation of the axis c and c' with respect to the subframe 504 which does not require the steering actuators 516 and 518 to actively adjust themselves as the swingarm 502 rotates with respect to the subframe 504. In this embodiment, having two steering actuators may still provide additional wheel camber control.

The first steering actuator 516 and second steering actuator 518 may be locked when the vehicle is travelling in a rectilinear motion to prevent the uncontrolled steering of the motor wheel 514 due to road disturbances and camber change of the motor wheel 514 because of gravity or road forces. An advantage of having camber control of the wheels separate from the camber of the frame of the vehicle is that the wheels may be kept close to neutral camber, for example, +/−5 degrees as the vehicle provides active roll control. Maintaining constant neutral camber may allow the use of flat profile tires like in a car as opposed to round profile tires like a motorcycle. The use of flat profile tires may improve rolling resistance and the life of the tire compared to a round profile tire. Having camber control means may additionally allow each wheel to compensate for camber change due to dynamic load transfer and tire deformation during vehicle turns.

In addition to the suspension control assemblies of 120, 320, and 500, other types of actuator assemblies to control the roll or pitch of the vehicle may be employed. For example, a separate actuator for only controlling roll motion separate from the control of the suspension of each wheel may be employed. Examples of separate roll and suspension control may include attaching the suspension and damper members of the two front and/or rear wheels to a single linkage which is translated with respect to the main frame member along vehicle axis y or rotated with respect to the main frame member about vehicle axis x.

Figure 10:
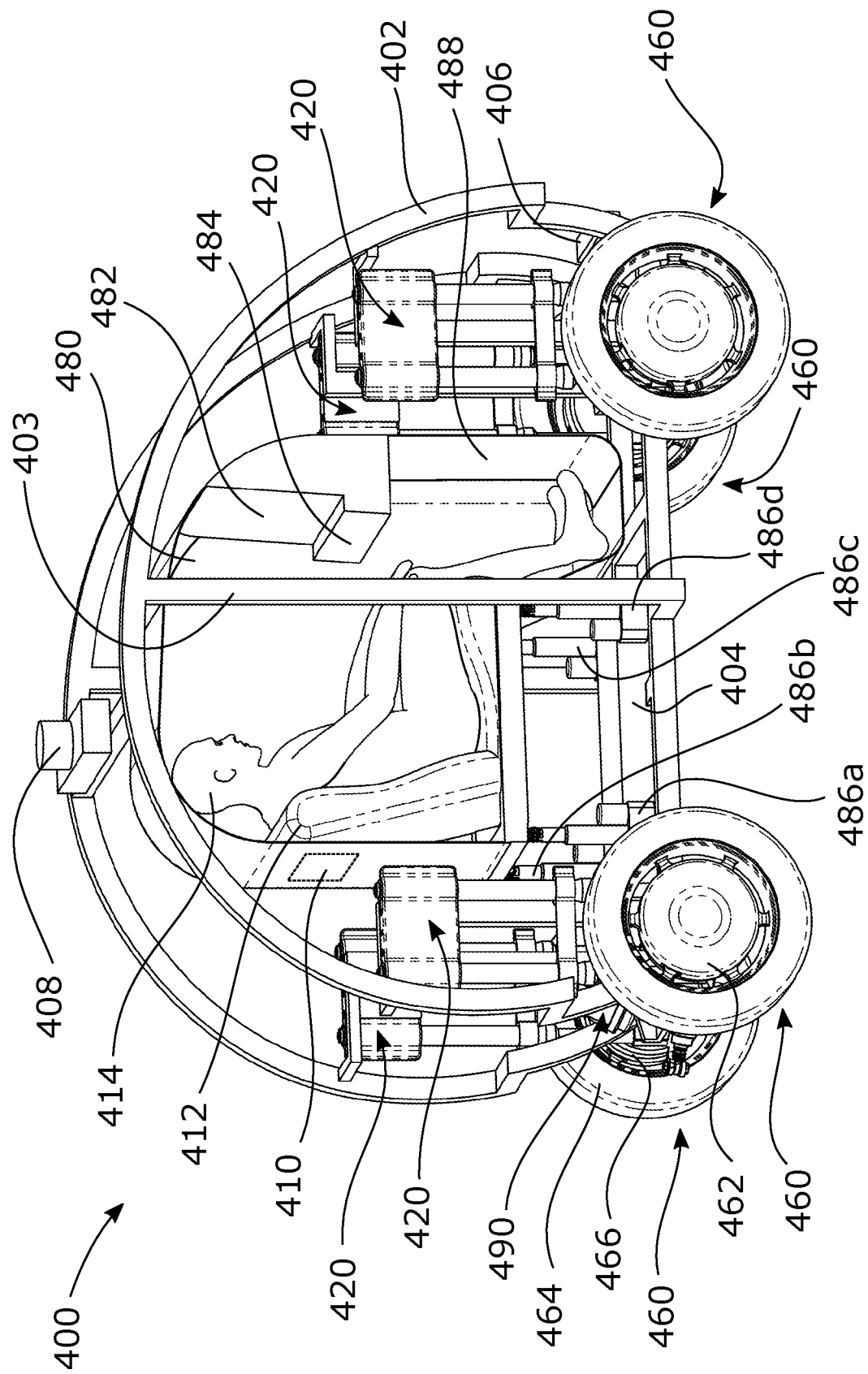
FIG. 10 is a perspective view of vehicle in accordance with various embodiments of the present application in a first mode of operation.
Figure 11:
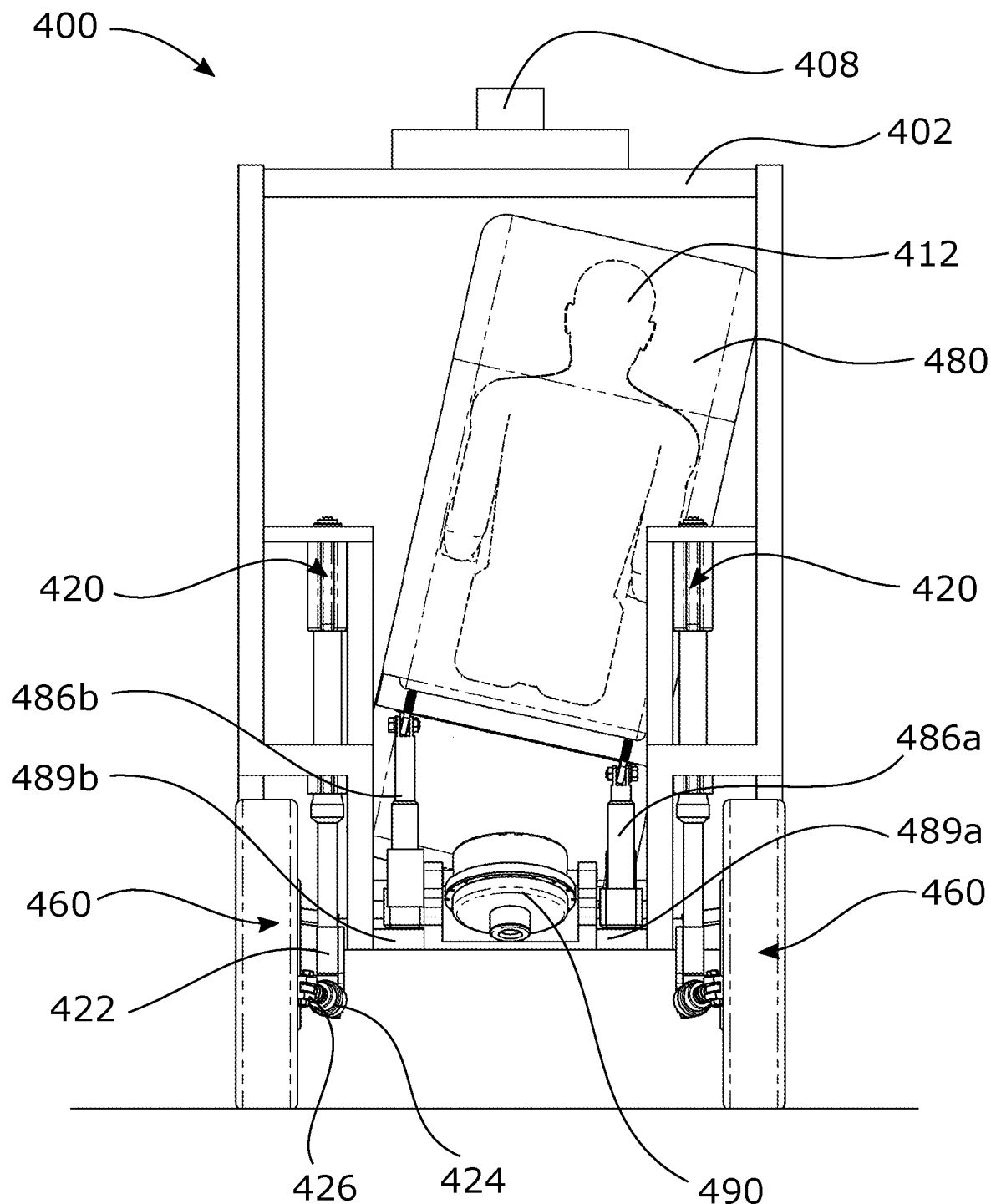
FIG. 11 is a rear view of the vehicle of FIG. 10 in a second mode of operation.

Shown in FIGS. 10-11 is a vehicle 400 according to other exemplary embodiments. The vehicle 400 may include a frame member 402, a battery 404 attached to said frame member, a first sensing assembly 406 at the front of the vehicle, a second sensing assembly 408 at the top of the vehicle, a seat 412 attached to the said frame member which may seat an occupant 414, a cabin 480 which is shown in FIG. 10 with its rights side removed, an inertial measurement unit 410 attached to said cabin, four suspension assemblies 420, four wheel control assemblies 460, and a gyrostabilizer assembly 490 attached to said frame member. The cabin 480 may be surrounded by the frame member 402 and may be attached to it with four motion actuators 486a, 486b, 486c, and 486d which may be each equipped with a brake and displacement sensor. The motion actuators may activate in such a way to subject the cabin 480 to at least heave, roll, and pitch motions with respect to the frame member 402. Each motion actuator 486a, 486b, 486c, and 486d may be attached to the frame member 402 via rubber mounts such as mounts 489a and 489b and to the cabin 480 via spherical joints.

Each wheel control assembly 460 may include a motor wheel 462 onto which is mounted a pneumatic tire 464 with a flat profile and a stator hub 466. A steering actuator 424 may be attached to a support member 422 on the end of each of the four suspension assemblies 420 on one end and to an arm 426 attached to the stator hub 466 on the other end. Each stator hub 466 may be pivotably supported by each of the support member 422 along a kingpin axis (not shown) which may allow each motor wheel 462 to be individually steered. The frame member 402 may have a side brace member 403 to provide impact protection for the cabin 480. The cabin 480 may contain a seat 412 upon which an occupant 414 may sit, an inertia measurement unit 410, a front door 488, a screen 482, and frontal airbag 484.

Compared to the vehicles 100 and 300, the vehicle 400 may use motion actuators to adjust the motion of only the cabin 480 instead of the suspension control assembly 120, 320, and 500 which adjusts the entire sprung masses of vehicles 100 and 300. Comparatively, the motion actuators 486a, 486b, 486c, and 486d may be either smaller in size and/or provide better control of the cabin 480 and its contents due to their smaller combined mass compared to the entire sprung masses of the vehicle 100 and 300. The motion of the frame member 402 and brace member 403 which provide a structure for mounting the vehicle components and offer crash protection for the occupant may be not directly controlled by the motion actuators 486a, 486b, 486c, and 486d which reduces the power requirements of the motion actuators. Accordingly, the cabin 480 may be made light in weight since it does not support the suspension assemblies 420 or provide structural crash protection for the occupant. The motion actuators used between the cabin 480 and frame member 402 may provide controlled motion of the cabin 480 in at least the heave, roll, and pitch directions because they are the most easily controlled and can compensate for most of the translational accelerations experienced by a ground vehicle.

The motion actuators (e.g., 486a, 486b, 486c, and 486d) may maintain a position near the middle of its range of travel each with brakes applied in static operation so that power consumption is reduced and there may be sufficient travel to adjust the motion of the cabin 480 with respect to the frame member 402 when required. The motion actuators may be coupled to the frame member 402 via rubber bushings which provides compliance to prevent binding of the motion actuators and for the reduction of noise transmission to the cabin 480. In other embodiments, spring and damper members may be connected in series with the motion actuators 486a, 486b, 486c, and 486d to provide additional passive road force attenuation to the occupant 414. The motion actuators connecting the cabin 480 to the frame member 402 may be other types such as rotary servo motors with linkages or independent motion actuators each constrained separately in roll, yaw, and heave. The motion actuators 486a, 486b, 486c, and 486d may act according to a control module which receives data from the inertial measurement unit 410 fixed relative to the cabin 480 as well as sensors which are used to predict the forces transmitted to the cabin 480 such as suspension travel sensors attached to the suspension assemblies 420.

In the vehicle 400, the frame member 402 may not have attitude control which simplifies the steering of the wheels. When there is a controlled roll motion of the occupants in the vehicle 100 and 300, the wheels may also develop a camber with respect to the road because of their fixed camber angle to the frame and occupants. This requires the wheel angle control modules in the vehicle 100 and 300 to adjust the angles of the wheels to compensate for the effects of camber if no lateral forces are desired. In the vehicle 400 this adjustment may not occur because the occupant motion may be separated from the frame and therefore wheels. However, there may be more dynamic load transfer in the vehicle 400 compared to the vehicles 100 and 300 because the frame member 402 may not tilt to produce a more stable gravitoinertial acceleration (GIA). The higher dynamic load may transfer in the vehicle 400 necessitates using stiffer suspension. The vehicle 400 may be equipped with one gyrostabilizer to provide a controlled moment in the roll axis to reduce excessive body roll and prevent vehicle roll over. In other embodiments, suspension control assemblies similar to 120, 320, and 500 may be used with vehicle 400 to reduce dynamic load transfer and further improve occupant comfort.

The space for the occupant in vehicle 400 may also be smaller compared to the vehicle 100 and 300 because the cabin 480 may require room within the envelope provided by frame member 402 to provide controlled attitude and heave motion and crash protection. The cabin 480 may be visually separable from the outside using opaque panels or adjustable tint windows since the relative visual motion of the cabin 480 and frame member 402 may increase the likelihood of motion sickness. Furthermore, the floor of the cabin 480 onto which the occupant 414 rests his/her feet and a screen 482 may also be fixed relative to the cabin 480 to increase comfort and reduce motion sickness. Fixing the frontal airbag 484 relative to the interior of the cabin 480 instead of relative to the frame member 402 may ensure that in the event of airbag deployment, the position of the occupant 414 when subjected to attitude and/or heave motions does not change with respect to the frontal airbag 484. Further items which may be provided in the cabin or fixed relative to it but not shown may include a table surface, additional airbags, lights, vehicle control means such as a steering wheel in some embodiments, and a seat belt. The battery 404, a first sensing assembly 406, second sensing assembly 408, and inertial measurement unit 410 may be operated in the same manner as vehicles 100 and 300. The vehicle 400 in FIG. 11 is shown to operating in a mode where the cabin 480 is tilted to for example, reduce the perceived lateral acceleration by the occupant 414.

Additional components not shown in the figures for occupant comfort and safety typically found in automobiles and self-driving automobiles may be included on the vehicles of the present application such as exterior and interior panels, doors, interior infotainment systems, lighting, windows, airbags, additional controllers and processing units, wireless network connections, vehicle user control means, and additional sensors for autonomous driving. The steering actuators of the exemplary embodiments may produce a linear motion while other types of steering actuators may be used such as ones that directly produce rotation.

In the exemplary embodiments, the steering angle of each wheel may be controlled independently. Having independent steering capabilities on all wheels may be advantageous in several ways. During attitude control, the wheelbase and track width of the vehicle may change with certain suspension control assembly embodiments such as assembly 120 which requires different steering angles from the wheels as a function of the vehicle attitude and suspension travel to reduce tire scrub. Lateral road force disturbances applied to a particular wheel may cause the wheel to develop a slip angle to oppose the lateral force which the occupant may experience as an uncomfortable yaw motion. Allowing each wheel to adjust its steering angle to produce lateral force to counter disturbances may reduce their effect on the occupant. During high speed lane change maneuvers, it is known to be beneficial to turn all wheels into the intended direction so that the vehicle undergoes a translational motion without yaw to improve comfort of the occupant.

A significant portion of the development process of a new vehicle may involve the design of the steering and suspension geometry which take into consideration the physical characteristics of a particular vehicle. By incorporating independent steering, suspension, and drive of each wheel, the control of vehicular motion may be decentralized and the development time of a new vehicle may be shortened significantly by changing of software parameters. It may also allow the use of similar or mirrored components to be used on each wheel which reduces the cost of the vehicle and simplifies maintenance. The vehicle can be braked, accelerated, and steered using multiple wheels which increases the redundancy and safety of the vehicle.

The lateral dimension of the vehicle may be kept small to alleviate congestion in urban traffic. The use of steering on all wheels may reduce the lateral space required for steering to achieve the same turning radius if only either the front or rear wheels steered. The center of rotation of the vehicle during a turn can be controlled more precisely by adjusting the steering angle on each wheel independently to provide more comfort and safety for the occupant. In other embodiments, some of the wheels of the vehicle may be non-steerable to reduce complexity.

Figure 12:
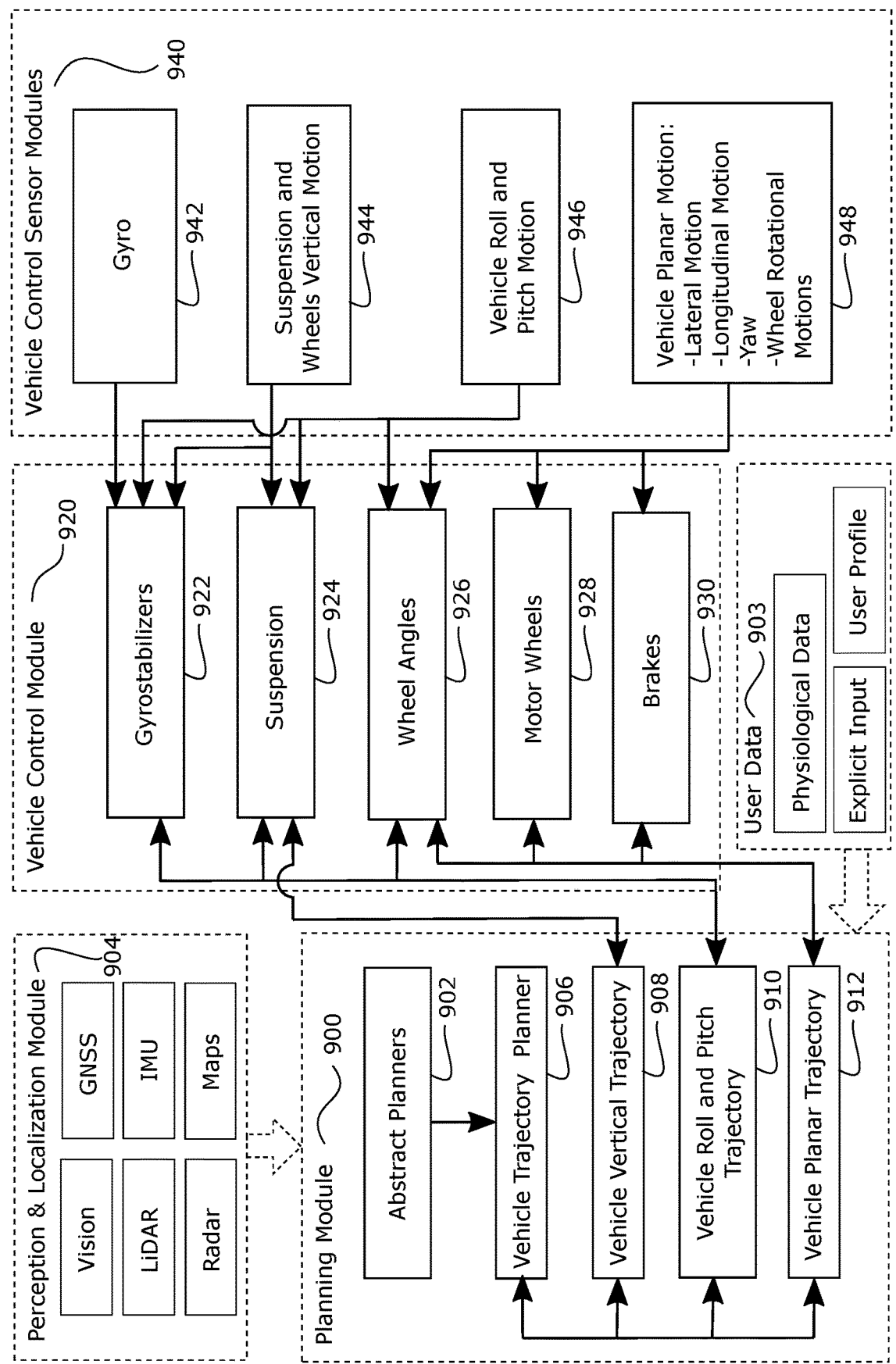
FIG. 12 is a schematic block diagram illustrating the planning and control of a vehicle according to various embodiments of the present application in one mode of operation.

Shown in FIG. 12 is a block diagram representing the planning and control framework of a vehicle of the present application according to exemplary embodiments. The planning module 900 may determine the trajectory of a vehicle through a series of steps using information received from the perception and localization module 904, user data 903, and feedback from the control module 920. The determined trajectory may define the vehicle state with respect to time for a planned distance ahead such as a planar vehicle path function or roll angle function with respect to time. Some of the sensors used by the perception and localization module 904 may be the sensing assemblies 200 and 108 of vehicle 100, the sensing assemblies 306 and 308 of vehicle 300, and the sensing assemblies 406 and 408 of vehicle 400. Inside the planning module 900, abstract planner 902 may determine a suitable behavior for the vehicle at an instance in time such as turning a corner, lane change, obstacle avoidance, road bump attenuation, maintaining vehicle attitude on a sloping road, lane keeping, etc. The abstract planner 902 may include a route planner which takes input from the occupant such as the destination and route preference and information from maps and traffic and calculates an optimal route with street level resolution for the vehicle to follow. The abstract planner 902 may further include a behavioral layer to determine based on the current location of the vehicle (using localization sensors such as GNSS, vision, IMU, and LiDAR) and obstacles such as other vehicles and pedestrians (using perception sensors such as vision, LiDAR, Radar, and Vehicle to Vehicle networks) the suitable behavior for the vehicle at an instance in time. The vehicle trajectory planner 906 may determine the optimal vertical trajectory 908, roll and pitch trajectory 910, and planar trajectory 912 based on satisfying a set of constraints such as obstacle avoidance, obeying traffic laws, and dynamic and kinematic constraints while optimizing a set of parameters such as maximizing occupant comfort, reducing travel time, minimizing energy consumption, maximizing safety and courteousness to other vehicles and pedestrians, etc. The trajectory planner 906 may also receive information from the control module 920 about the current state of the vehicle in at least the controllable degrees of freedom such as suspension positions, vehicle attitude, and wheel angles.

In some modes of operation, the planned trajectories may be representative of higher level quantities that cannot be directly controlled by the servos such as quantities measured by the IMU, vehicle attitude, and odometry information. These quantities may be affected by more than one servo and may also be influenced by the dynamics of the vehicle. In other modes of operation, the planned trajectories may be lower level servo commands such as the position of a servo with respect to time. The lower level planned trajectories may be used for example when the higher-level quantities are not critical or when the controlled components cannot move fast enough to provide higher level feedback control. An example of a lower level trajectory produced by the trajectory planner 906 may be a planned vertical trajectory of the vehicle when travelling over a road irregularity which requires the suspension servos follow a certain trajectory but does not require a feedback control using the actual vertical position of the vehicle because it is not critical to safety and the road irregularity occurs too abruptly.

The optimization of the parameters in the trajectory planner 906 may be based at least in part on user data 903 from explicit user input from a graphical user interface or voice commands, a user profile using demographic data and data from past trips, and in one embodiment on measured physiological data. The measured physiological data may be in part gathered from vehicle sensors to determine, for example, occupant body temperature, body movement, humidity, and heart rate which are indicative of occupant comfort. Based on the set of user data, the trajectory planner 906 may assign varying weights to certain optimization parameters. For example, a vehicle carrying an occupant known to be prone to or is showing signs of motion sickness may assign a higher importance for occupant comfort and lower importance for reduced travel time. In one embodiment, the weighting of different optimization parameters may change over time depending on the length of the trip. It is known that motion sickness is a cumulative effect which means trips shorter in duration and experiencing less accelerations can place greater importance on a shorter travel time. As the trip length increases or the occupant experienced accelerations accumulate faster than expected due to for example uneven roads and unexpected traffic, the vehicle trajectory planner may advantageously provide a more comfortable ride while placing less importance on shorter travel time. It is known that motion in certain frequencies contribute greater to motion sickness than others. In one embodiment, the trajectory planner module may consider frequencies of anticipated vehicle motions during optimization. For example, a vehicle trajectory candidate which will by estimation include vehicle heave motion at 1-2 Hz which is known to cause motion sickness will be judged by the vehicle trajectory planner to be worse than another vehicle potential trajectory which includes vehicle heave motion at 10 Hz which is not known to induce motion sickness.

The vehicle trajectory planner 906 may determine the optimal vertical trajectory 908, roll and pitch trajectory 910, and planar trajectory 912 which is passed to the vehicle control module 920 comprised of individual controllers. Each controller may receive data from sensors modules 940 and control various actuators which work synchronously to meet the planned trajectories. The abstract planner 902 and vehicle trajectory planner 906 may be re-evaluated during behavior execution when the predicted vehicle state or surroundings sufficiently differ from measurement such as unexpected movement of traffic or vehicle trajectory.

The gyrostabilizer control module 922 may follow the vehicle roll and pitch trajectory 910 by using data from roll and pitch motion sensor module 946 and from suspension sensor module 944 which may for example predict the forces exerted by the unsprung masses on the sprung mass that cause pitch and roll motion. The suspension sensor module 944 may include sensors to determine the position, velocity, and acceleration of the wheels and suspension actuators with respect to the frame. For example, the suspension control assembly 120 may use a rotation sensor between the upper link 124 or lower link 134 and the subframe 128 and another sensor to detect the displacement of suspension actuator 135. The gyrostabilizer control module 922 may further control the gyrostabilizer precession actuators such as the precession actuators 184 and 192 according to the gyro sensor module 942 to generate controlled torque about the roll and pitch axis of the vehicle. The gyro sensor module 942 may include precession angle sensors and flywheel spin angular velocity sensors from each flywheel assembly such as the flywheel assemblies 162 and 164 to estimate the torque produced by the gyro assemblies. For example, when the gyrostabilizer control module 922 senses from pitch motion sensor module 946 a roll motion of the vehicle different from the prescribed roll and pitch trajectory 910, it may control the gyrostabilizer assembly 160 of vehicle 100 to generate a torque to return the roll angle of the vehicle back to the correct roll and pitch trajectory 910.

The suspension control module 924 may control suspension actuators to maintain the desired vehicle vertical trajectory 908 and desired roll and pitch trajectory 910 and may acquire data from suspension sensor module 944 and vehicle roll and pitch motion sensor module 946. For example, the suspension control module 924 may activate the suspension actuators on one side of the vehicle more than the other side, which subjects the vehicle to a prescribed roll trajectory and may also reduce or increase the compression of the suspension for a certain set of wheels to maintain a flat vehicle vertical trajectory over road irregularities. The suspension actuator 135 of vehicle 100, the suspension actuator 325 of vehicle 300, the suspension actuator 520 of suspension control assembly 500 may be controlled by suspension control module 924. The motion actuators 486a, 486b, 486c, and 486d of vehicle 400 may also be controlled by a controller similar to suspension control module 924 except only the cabin 480 is controlled in vehicle 400 instead of the entire sprung mass as in vehicle 100 and 300.

The wheel angle control module 926 may help to maintain vehicle planar trajectory 912 while receiving data from vehicle planar motion sensor module 948 and from the vehicle roll and pitch motion sensor module 946. The vehicle planar motion sensor module 948 may include sensors from rotation sensors on each wheel for odometry and data from an inertial measurement unit attached to the frame member of the vehicle which includes accelerometers in the x-axis and y-axis and a gyroscope in the z axis for yaw motion. The vehicle roll and pitch sensor module 946 may include accelerometers inside an inertial measurement unit attached to the frame member of the vehicle and data from the suspension sensor module 944. The steering actuators 141 of vehicle 100, steering actuators 330 of vehicle 300, and steering actuators 516 and 518 of suspension control assembly 500 may be controlled by the wheel angle control module 926. The control of the wheel angles may be based not only from the vehicle planar motion sensor module 948 but also vehicle roll and pitch motion sensor module 946. The vehicle of the present application is expected to undergo large pitch and roll motions to counteract the lateral and longitudinal acceleration forces to provide more comfort for the occupant and greater vehicle stability. The large pitch and roll motions of the frame member significantly may change the lateral forces produced by the tires and the steering geometry if no adjustments are made. For example, when a vehicle equipped with suspension control assemblies 120, 320, or 500 undergo a large roll motion, the wheels and tires may maintain nearly the same camber angle with the frame member and consequently develop camber angles with respect to the road which produce large lateral forces. If the wheel angle control module 926 does not consider the roll motion of the vehicle, the vehicle would have a larger than desired yaw moment and lateral motion due to the additional lateral forces developed from wheel camber. Furthermore, the lateral forces developed by tire camber may arise faster than those developed from side slip alone, which makes vehicle motion that is controlled only by adjusting the steering angle reactively to the measured vehicle planar motion more difficult. The wheel angle control module 926 may use models of camber stiffness and lateral stiffness of the tires which are continuously updated by measuring the planar motion of the vehicle and deriving the lateral forces at each wheel compared to the camber and side slip angles. Updating the camber and lateral stiffness models of the tires may be advantageous because their characteristics changes depending on the tire, tire pressure, road conditions, etc. Incorporating the camber stiffness and lateral stiffness of the tires may allow the wheel angle control module 926 to maintain the prescribed planar trajectory 912 precisely by compensating for lateral forces developed from wheel camber angles before they affect the planar motion of the vehicle.

In suspension control assemblies such as suspension control assembly 120 and 320, the turn angles of the wheels may be reduced as the vehicle roll angle becomes larger to maintain the same lateral motion or yaw rate of the vehicle. In suspension control assemblies such as suspension control assembly 500 where the camber angle of the wheel can be controlled independent of vehicle roll angle, the wheel angle control module 926 in one embodiment may receive vehicle roll motion data and maintain a nearly neutral camber between the wheels and road so that camber thrust is kept low. In one embodiment, the wheel angle control module 926 may provide additional braking force on the vehicle by applying significant toe angles between the wheels when the demand for braking deceleration is higher than can be afforded by the friction and regenerative brakes alone such as in emergency situations or brake failure.

The motor wheel control module 928 and brake control module 930 may both help to maintain vehicle planar trajectory 912 by controlling the longitudinal forces applied by each wheel while taking data from the vehicle planar motion sensor module 948. In some modes of operation, the forces applied at each wheel may be controlled independently of the other wheels to aid in precise planar trajectory control and especially when one or more of the tires encounter high slippage with the road at the limits of traction. The motor wheels 144 in vehicle 100, motor wheels 354 in vehicle 300, motor wheel 514 in suspension control assembly 500, and motor wheel 462 in vehicle 400 may be controlled by the motor wheel control module 928.

The vehicle control sensor modules 940 may include sensors and processing electronics to compute desired quantities. For example, data from rotation sensors attached to linkage suspension designs such as suspension control assembly 120 may be converted to vertical displacements, velocities, and accelerations of the wheel. It is possible for two different sensor modules to use the same actual sensors for data. For example, the roll and pitch motion sensor module 946 and suspension sensor module 944 may both take data from the sensors mounted on the suspension control assemblies and compute the desired quantities. The block diagram of FIG. 12 does not limit the implementation architecture, which may be for example distributed among multiple circuit boards and software programs or centralized into a single unit such as the control module 110 of vehicle 100 and the control module 310 of vehicle 300. In other embodiments, planning and control frameworks other than the embodiment shown in FIG. 12 may be used. The framework in FIG. 12 represents a hierarchal framework in which more abstract planning is performed first in a series of steps. In other embodiments, planning and control frameworks may be employed in which tasks are performed more in parallel.

The vehicle vertical trajectory 908, vehicle roll and pitch trajectory 910, and vehicle planar trajectory 912 may be determined together and may be related to each other during execution because it is advantageous to couple the different trajectories due to the coupling of physical states in the different trajectory modules. For example, a specific yaw trajectory of the vehicle may produce a lateral acceleration trajectory of the vehicle which influences the roll trajectory of the vehicle due to the generation of roll moments on the vehicle. A similar relationship may exist between the longitudinal acceleration of the vehicle and the pitch. In one embodiment, the vehicle may have a lateral translational trajectory demand which moves it initially laterally away from the final lateral translation direction by a small amount and have a roll trajectory demand that at the same time rolls the vehicle into the final direction. This maneuver may reduce the power requirement for roll trajectory while maintaining the head of the occupant in a more rectilinear path versus if the vehicle is rolled without lateral movement because the roll center of the vehicle is below the head of the occupant. The initial opposite lateral translation maneuver may take into consideration the height difference between the vehicle roll center and the passenger head center. Pure rolling motion of the head of an occupant is known to cause less motion sickness than combined rolling and translation. This maneuver embodiment is described with more detail as one possible embodiment illustrated by FIG. 13

Figure 13:
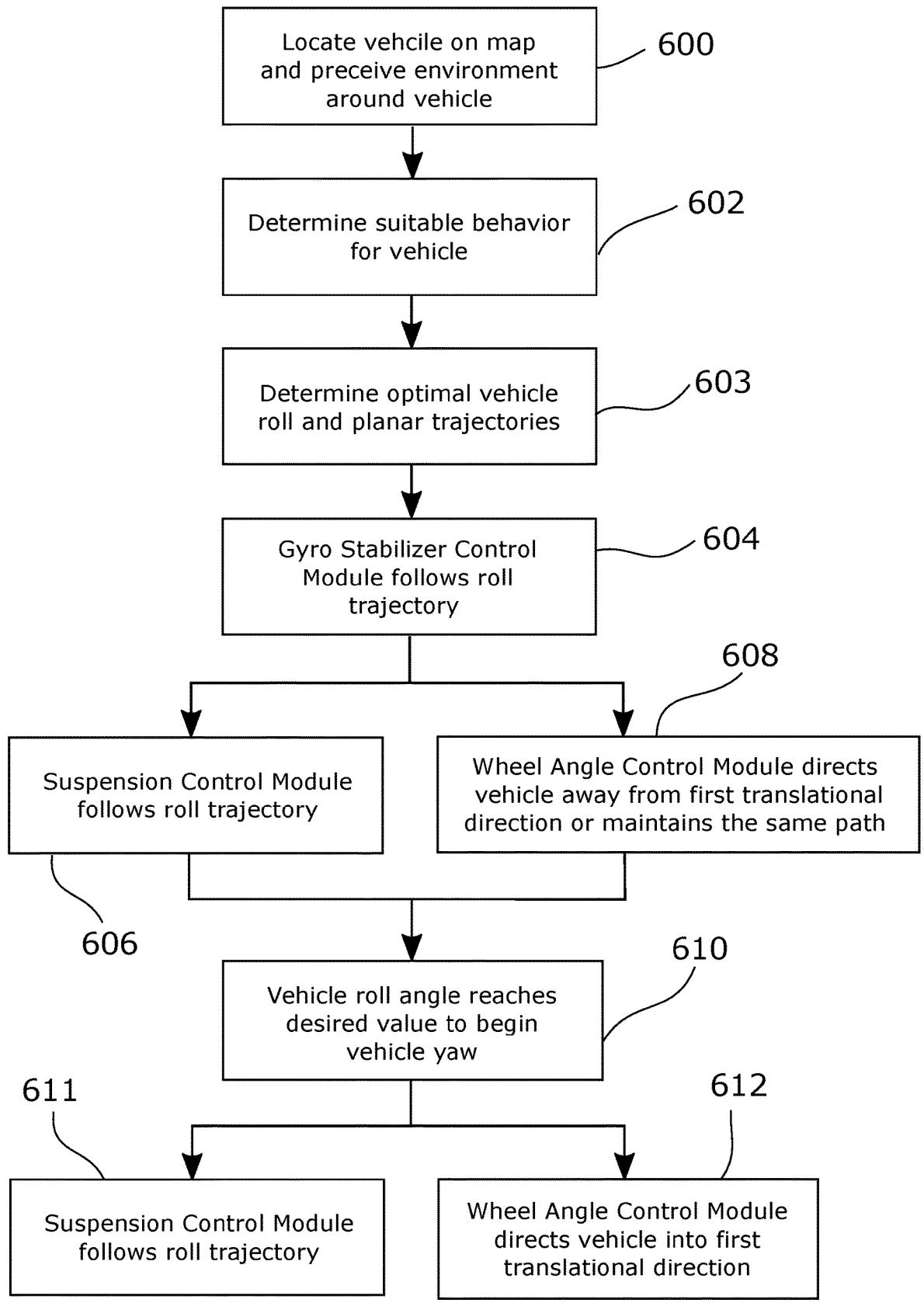
FIG. 13 is a flowchart illustrating a planning and control process of a vehicle of the present application in accordance to various embodiments in one mode of operation.

Shown in FIG. 13 is a flowchart of a method of a vehicle undergoing a lateral translation in a main direction which subjects it to a lateral acceleration in a direction substantially opposite to the main direction according to exemplary embodiments. The behavior mode may be for example a pure translation such as steering all wheels when making a high-speed lane change or combined translation and yaw such as turning onto a cross street at an intersection or following the natural turn of a road. Process 600 may include performing perception and localization which may include for example using one or more maps and a computer vision system to locate the vehicle on one or more maps and determining potential obstacles around the vehicle. Perception and localization sensors may also include LiDAR, radar, GNSS, inertial measurement units, and odometry. In the process 602, the vehicle may determine using information from process 600 an appropriate behavior which may include a lateral translation in a main direction. In the process 603, the roll and planar trajectories of the vehicle may be determined by satisfying a set of constraints such as obstacle avoidance, obeying traffic laws, and dynamic and kinematic constraints while optimizing a set of parameters such as maximizing occupant comfort, reducing travel time, minimizing energy consumption, maximizing safety and courteousness to other vehicles and pedestrians. The roll trajectory determined in process 603 may lean the occupant of the vehicle into the main direction so that the longitudinal axis of the occupant's head and body becomes closer to the gravitoinertial acceleration (GIA) and the perceived lateral acceleration by the occupant becomes reduced. For example, in the vehicle frame coordinate system of FIG. 1 if the behavior of the vehicle is to turn left onto a cross street at an intersection, the main direction of translation may be in the positive y direction which would subject the occupant to a lateral acceleration in the opposite direction which in this case is the negative y direction. The roll trajectory would in this example prescribe a roll into the main direction which may be the same as a roll about the negative x direction. In the process 603, the roll angle of the vehicle in the roll trajectory may be determined at least in part by the anticipated lateral acceleration determined from the planar trajectory. The maximum roll angle of the vehicle may increase in proportion with the maximum anticipated lateral acceleration of the vehicle and the amount of tilt may compensate for at least 50% of the lateral acceleration. For example, if the vehicle has a planned planar trajectory which experiences a lateral acceleration of 0.2 g the vehicle may have a planned roll trajectory which demands a lean angle of at least 0.1 rad from vertical.

In one embodiment, the vehicle may control the precession actuators on the roll gyrostabilizers in process 604 to begin vehicle roll through precession or to prevent the roll gyro stabilizers from interfering from roll motion caused by the suspension actuators in a later process by preventing the flywheels from precessing. In another embodiment, the vehicle may not be equipped with roll gyrostabilizers and process 604 may be omitted. In another embodiment, the process 604 may occur at the same time as process 606 and 608. In the process 606, the vehicle may begin to follow the roll trajectory using the suspension actuator control module. In the process 608, which represents the initial behavior taken by the wheel angle control module during a translation behavior of the vehicle, the wheel angle control module may adjust the angles of the steered wheels to maintain either the same path before process 604 or steer the vehicle opposite from the main translational direction. In the process 608, the wheel angle control module applied to the exemplary suspension control assembly 120 and suspension control assembly 320 may actively steer the wheels away from the main direction to cancel out the lateral forces generated by the wheel camber due to vehicle roll motion. All the wheels that are subjected to camber due to the roll motion caused by process 606 may be controlled by process 608 to turn away from the main direction. Turning away from the main direction in this context means for example if the lateral translation behavior of the vehicle is to make a left turn at an intersection, in process 608 the wheel control module would turn the wheels clockwise. The wheel angle control module applied to the exemplary suspension control assembly 500 may either turn the wheel away from the main direction by substantially activating steering actuator 516 shown in FIG. 9 or maintain a neutral camber by substantially activating steering actuator 518 shown in FIG. 9. By maintaining either the same path or steering the vehicle away from the main direction in process 608, the lateral acceleration opposite the main direction the occupant experiences during the initial roll motion may be reduced. If the wheel angles were not actively controlled by process 608 at the same time as process 606, the occupant would experience a rolling motion combined with a lateral acceleration and potentially also a yaw velocity. The combined rolling, lateral, and yaw motion is known to induce motion sickness in occupants. The vehicles of the present application may use perception and localization sensors combined with trajectory planers to predict and control the trajectory of the vehicle which means it is able to anticipate the lateral acceleration of the vehicle opposite the main direction due a translation motion in the main direction and apply a compensating roll during the initial behavior.

In process 610, the roll motion of the vehicle may have reached a target value for the current translational behavior and the translation of the vehicle into the first direction may begin. Most of the roll motion of the vehicle for the first portion of the current behavior may have been completed by this point and the roll angle of the vehicle may have reached close to its steady state value which may compensate for the lateral acceleration experienced during the translation of the vehicle in the main direction. In the process 612, the wheel angle control module may translate the vehicle in the main direction according to the planar trajectory determined in process 603. In the process 612, the wheel angle control module applied to the exemplary suspension control assembly 120 and suspension control assembly 320 may actively steer at least some of the wheels in the opposite direction as in process 608. In the process 612, the wheel angle control module applied to the suspension control assembly 500 may either steer at least some of the wheels into the turn by substantially activating steering actuator 516 shown in FIG. 9, cambering some of the wheels in the opposite direction as in process 608, or actuating the steering actuator 516 and 518 both to cause the vehicle to translate into the main direction. Depending on the behavior of the vehicle, the wheel angles may be advantageously controlled in several different strategies to execute the translational behavior. For example, during low speed turn behavior, the back wheels may be turned in the opposite direction as the front wheels to reduce the turning radius. During high speed lane changes, the back wheels may be turned in the same direction as the front wheels to produce a motion that is mostly translational and reduced in yaw. In any control strategy except in emergency situations where response time is critical, the lateral vehicle acceleration which is controlled in part by the wheel angle control module may only substantially begin to increase in process 612. This may prevent the overlap of lateral acceleration and roll motion which is known to cause motion sickness.

In the process 611, the roll trajectory may continue to follow the roll trajectory determined in process 603 at the same time as process 612 which now may produce significant planar trajectory of the vehicle when compared to process 608 which may produce a mostly straight vehicle path with significantly less planar motion. The suspension control module in process 611 may communicate with the wheel angle control module in process 612 because planar motions of the vehicle may produce lateral accelerations which will produce a moment on the masses of the vehicle and cause a roll motion substantially opposite from the main direction. Conversely, the roll angle of the vehicle may produce lateral forces which may affect the planar motion of the vehicle. Due to the non-holonomic nature of the vehicles in the exemplary embodiments, a yaw motion produced by process 612 may also produce a translational motion but the vice-versa is not true such as during a high-speed lane change maneuver in which all wheels are turned in the same direction and by the same amount and there is no yaw motion.

When the vehicle exits the turn in this translational behavior embodiment so that the lateral acceleration opposite the main direction is reduced (towards only rectilinear motion), the roll angle of the vehicle may also be reduced through the suspension actuators and/or gyrostabilizers so that the vehicle returns to an upright orientation. During execution of the exemplary embodied processes, the processes 600, 602, and 603 may be continuously re-evaluated which may change the trajectories of the vehicle determined in process 603 based on for example, the actual measured trajectory of the vehicle or the state of obstacles which may be different than predicted. The exemplary processes illustrated in FIG. 13 may be different from that of a tandem wheeled vehicle such as a motorcycle or bicycle in that the separate attitude controller afforded by the suspension actuators and gyrostabilizers of the exemplary embodiments may allow some degree of decoupling between the roll motion of the vehicle and the wheel angles. In a tandem wheeled vehicle, the roll moments of the vehicle may be balanced during a quasi-static state such as during constant vehicle yaw and roll angles because there is no means of resisting any unbalanced moments due to having the wheels in tandem. Therefore, the amount of vehicle roll during a turn in a tandem wheeled vehicle may be close to the value that completely compensates for the lateral acceleration experienced. Furthermore, when the vehicle roll does not completely compensate for the lateral acceleration in the exemplary embodiments, the use of the brakes on the suspension actuators may allow the wheels to resist the unbalanced moment without consuming power which may improve the efficiency of the vehicle.

The distinction between the process 608 and 612 may be that in process 608 the wheel angle control actively may manipulate the wheel angle actuators such as the steering actuator 141 of vehicle 100, steering actuator 330 of vehicle 300, and steering actuators 516 and 518 of suspension control assembly 500 to turn the vehicle away from the main translational direction absent the roll motion so that combined with the camber forces developed by the wheels due to the roll motion, the path of the vehicle may be substantially straight or away from the main translational direction, while process 612 may turn the vehicle into the main translational direction. The process 608 and 612 may be organized as two distinct steps in the planned trajectory of the vehicle or as part of a continuous planned trajectory.

The above mode of operation is exemplary for a lateral translational motion and a similar process may be employed for a longitudinal acceleration which demands a pitch motion to align the occupant's longitudinal axis to the GIA. If the desired motion of the vehicle is straight with no steering required during longitudinal acceleration, the wheel angle control module may not intervene since in this case there is no coupling between the pitch motion and translational motion of the vehicle. The pitch motion may be started before longitudinal acceleration to reduce the overlap of pitch and longitudinal motion which may cause motion sickness. When there is combined longitudinal and translational motion which may require combined roll and pitch attitude control, the wheel angle control module may additionally adjust the wheel angles to account for the change in the wheel's kingpin axis orientation during pitch attitude change.

Figure 14:
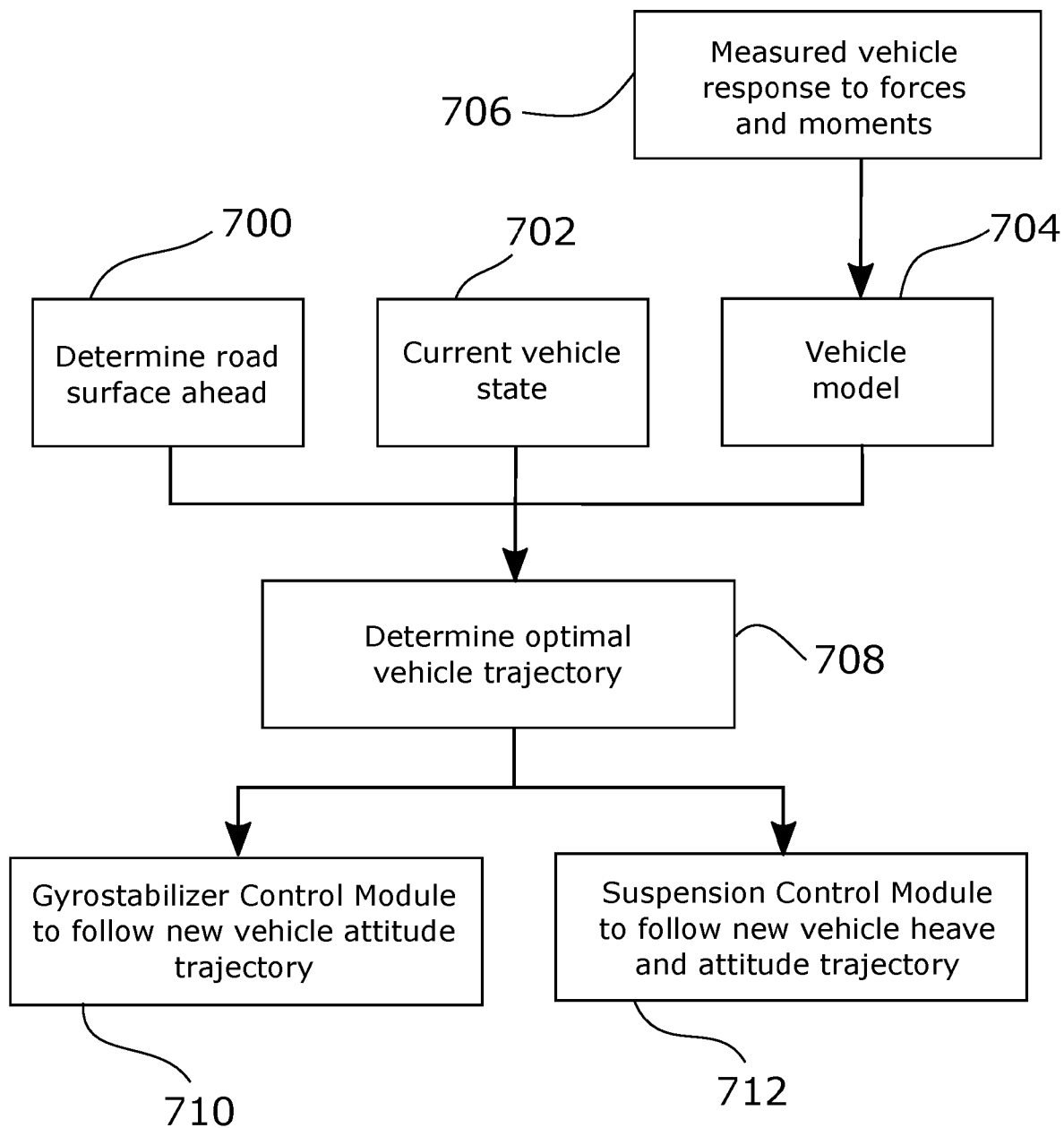
FIG. 14 is a flowchart illustrating a planning and control process of a vehicle of the present application in accordance to various embodiments in a second mode of operation.

FIG. 14 shows a flowchart of a method of a vehicle traveling over a road surface irregularity such as a speed bump using the suspension control module in combination with the gyrostabilizer control module according to a preferred embodiment. First in the process 700 a road surface irregularity may be determined by a perception sensor which may be for example a machine vision system, LiDAR, or may be known based on a map containing road surface information and the localization of the vehicle on the map using sensing means such as a machine vision system, LiDAR, or GNSS. The vehicle control module may then determine the optimal vehicle trajectory in process 708 using the road surface information from process 700, the current measured state of the vehicle from a process 702, and using a model of the vehicle from the process 704. The optimal vehicle trajectory for the exemplary method may be to activate the suspension actuators and gyrostabilizers to reduce the accelerations felt by the occupant. In other modes of operation, the optimal vehicle trajectory may be for example to drive around the road surface irregularity or to activate only the gyrostabilizers. The process 702 may measure at least the current speed, location, and heading of the vehicle to determine the vehicle state. The determination of the optimal vehicle trajectory may include the estimated response of the vehicle in pitch, roll, and heave and may be determined from a model of the vehicle which may include at least one degree of freedom for each wheel and three additional degrees of freedom for the roll, pitch, and heave response of the sprung mass. The model of the vehicle may be updated based on the actual measured response of the vehicle such as the roll, pitch, and heave response after measured input such as motions of the wheels. The structure of the model may be represented by physical elements such as using spring, damper, and mass elements or of any other type that may model the vehicle response when subjected to inputs such as road surface inputs. The updating of the model of the vehicle may be advantageous because the mass of the occupant and luggage may not be always the same and may represent a significant portion of the mass of the vehicle. The optimal vehicle trajectory may be determined in process 708 by optimizing a set of parameters such as power consumption, accelerations felt by the occupant, and safety. In the process 710 the gyrostabilizer control module may be used to control the gyrostabilizer precession actuators to follow the attitude trajectory determined in 708. At the same time in the process 712 the suspension control module may follow the heave and attitude trajectory determined in 708 by controlling the suspension actuators.

According to another embodiment, the road surface information from process 700 may not be used in determining the optimal vehicle trajectory in process 708 because for example the perception sensors may fail to detect the road surface irregularity. The process 702 may predict the forces that will be applied to the sprung mass of the vehicle due to the motion of the wheels after encountering the surface irregularity which will compress the spring and damper members. The movement of the wheels may be measured for example using the suspension and wheels vertical motion sensor module or using accelerometers mounted to each wheel. Since the suspension of a vehicle may act as a low pass filter for the road surface, by measuring the motions at the wheels there may be sufficient time in certain circumstances to control the gyrostabilizers and/or suspension control assemblies to counteract the forces from the road and achieve a smoother ride for the occupant.

An exemplary mode of operation in which a vehicle may travel over a longitudinal surface irregularity and the corresponding details of the processes 710 and 712 are herein described. The suspension actuators may first reduce the load on the front of the vehicle by decompressing the front spring and damper members while the gyrostabilizers may be actuated to apply a first moment to counteract the pitching of the vehicle that would otherwise occur due to the reduced load on the front of the vehicle. At the same time, suspension actuators may also compress the rear spring and damper members so that the vehicle does not heave downwards due to the increased load placed on the rear wheels. The gyro stabilizer and suspension actuators may work synchronously to maintain the vehicle attitude and vertical position while reducing the load on the front wheels. The reduced load on the front wheel means that the force passed to the sprung mass due to the forced upward movement of the front wheels passing over the bump may be reduced. In some modes of operation, the front wheels may be momentarily lifted off the ground to clear the bump completely before encountering the bump which may be used for example when the bump is tall. In other modes of operation, the front suspension actuators may be decompressed in response to their measured upward motion.

After the vehicle's front wheels pass over the bump but before the rear wheels pass over, the suspension actuators may increase the load on the front wheels while reducing the load on the rear. Increasing the load on the front wheels immediately after passing over the bump may also improve the road holding ability of the vehicle. The pitch gyro stabilizers may be precessed to generate a moment opposite the first to counteract the tendency of the vehicle to pitch backwards due to the reduced load on the rear wheels. After passing over the bump, there may still be significant forces transferred to the unsprung mass due to for example the high speed of the vehicle, slow response of the suspension actuators, or large height of the bump. The control module may monitor the pitch of the vehicle and force the gyrostabilizers to precess using the precession actuators to counteract pitching motion of the vehicle with the help of the suspension actuators to also reduce heave motion. In another embodiment, the gyrostabilizer control module and suspension control module may not use vehicle motion as feedback and simply adhere to the prescribed function of the actuators' displacements due to for example insufficient response time of the suspension control or gyrostabilizer assemblies. In another mode of operation, a similar strategy may be employed for road bumps running along the direction of the road that may subject the vehicle to a roll instead of pitch motion by activating the suspension actuators of the vehicle in a lateral pattern in combination with gyro stabilizers that may control the roll motion of the vehicle.

Before and after the bump is encountered and when no suspension actuator motion is required, the brakes in the actuators may be operated so that the energy consumption of the actuators is reduced. In other embodiments, the gyrostabilizers may be used without the suspension actuators to control the attitude of the vehicle without control of the heave motion. In some embodiments the vehicle's center of rotation in pitch and roll may not be at the occupant's head level which means that roll and pitch motion of the vehicle may also create lateral and longitudinal accelerations of the occupant's head. The combined motion created by pitch and roll of the vehicle is known to cause motion sickness whereas small heave motions alone do not. In one embodiment the damping coefficient provided by the spring and damper members may be controlled by the vehicle control module to improve comfort and vehicle control depending on the mode of operation. The damping coefficient may be set low to provide low damping during rectilinear motion over roads that are smooth or with disturbances below the wheel hop frequency to improve occupant comfort. When it is detected that the wheels are moving close to the wheelhop frequency, the damping coefficient may be set higher to reduce the force transmitted to the sprung mass. The damping coefficient may be set high during fast planar motions to reduce compression of the spring and damper members due to longitudinal and lateral accelerations.

In automobiles with passive or semi-active suspensions, a tradeoff between occupant comfort and vehicle stability and handling may be usually to be made. A vehicle that is optimized for comfort typically may use softer springs to provide more comfort but may experience greater pitching during longitudinal accelerations and roll during lateral accelerations due to dynamic load transfer that may compromise handling and available tire grip compared to a vehicle optimized for performance but uses harsher springs. It is known that the heave, pitch, and roll motions of a vehicle may affect the occupant to a different degree and that the natural frequencies of heave, pitch, and roll may be determined by the characteristics of the spring and damper members and the mass distribution of the vehicle. In a vehicle with a small footprint, the mass of the occupants may make up a significant portion of the mass of the vehicle and thus the type and positioning of the occupants may affect the interaction of heave, pitch, and roll and may create undesirable couplings between them which may cause motion sickness. The pitch, roll, and heave motions of the vehicle may be reduced or at least manipulated by the suspension controllers and gyrostabilizers somewhat independently so that the motions are less likely to cause motion sickness. The suspension controllers and gyrostabilizers may also reduce dynamic load transfer by tilting the vehicle to balance the planar accelerations with gravity.

Typically, a vehicle with a short track and wheelbase may be subject to uncomfortable pitch and roll motions because of a reduction in pitch and roll inertia and geometrically the same size bump on a road may create a larger pitch and roll angle than a vehicle with a longer track and wheelbase. However, a vehicle with a short track and wheelbase may also allow better active attitude control by an active vehicle attitude control system because of reduced pitch and roll inertia. Furthermore, if the vehicle attitude control is performed with independent vertical displacement of the wheels, less vertical displacement may be required for the same desired angle due to geometry. For example, a single person wide vehicle with a track width of approximately 1 m may achieve a roll angle of 30 degrees with a linear wheel displacement difference of 0.5 m between the left and right wheels which may cancel out lateral accelerations up to 0.6 g. A vehicle with a wheelbase of approximately 1.2 m may achieve a pitch angle of 25 degrees with a linear wheel displacement difference of 0.5 m between the front and back wheels which may cancel out longitudinal accelerations up to 0.5 g. This amount of vehicle tilt may allow the lateral and longitudinal accelerations under normal driving conditions to be completely compensated and allow the vehicle to reach its destination faster while reducing the discomfort to the occupants.

The response time of the gyro stabilizers to provide torque and the suspension actuators to provide displacement of the suspension members may not be instantaneous due to the electrical time constants of the electrical components and mass and inertia of the mechanical components. For example, for the gyro stabilizer to produce torque without the presence of a vehicle roll about the torque axis, the actuator should overcome the inertia of the gyro stabilizer and friction forces to precess the flywheels before control torque can be generated. A system which anticipates road disturbances through perception and localization means using sensors such as GNSS, radar, machine vision, LIDADR, combined with a model of the anticipated response of the vehicle in response to the road disturbances may allow these actuators to act ahead of time to follow a generated trajectory plan to provide improved vehicle stability and occupant comfort.

Figure 15:
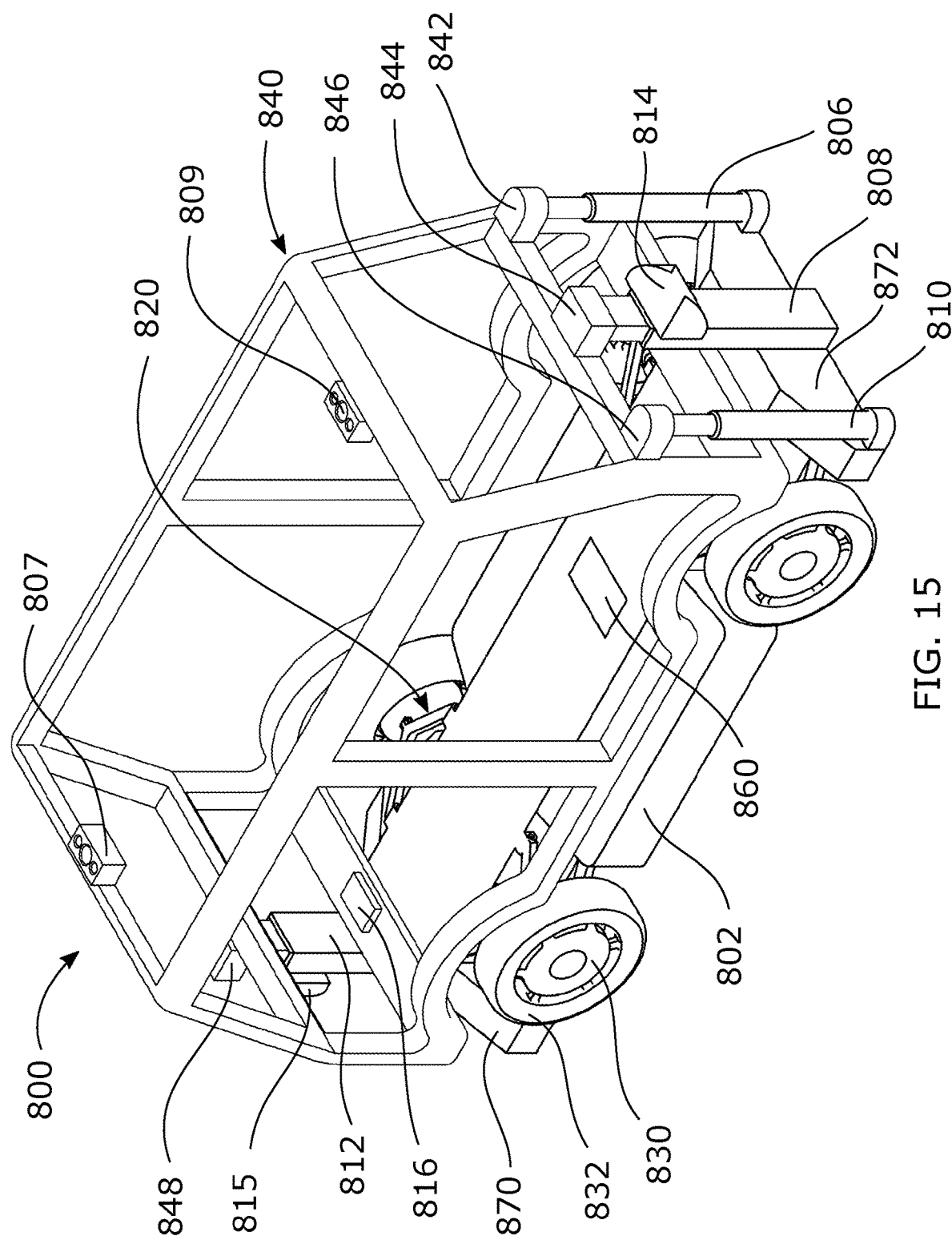
FIG. 15 is a perspective view of a vehicle in accordance with various embodiments of the present invention.
Figure 16:
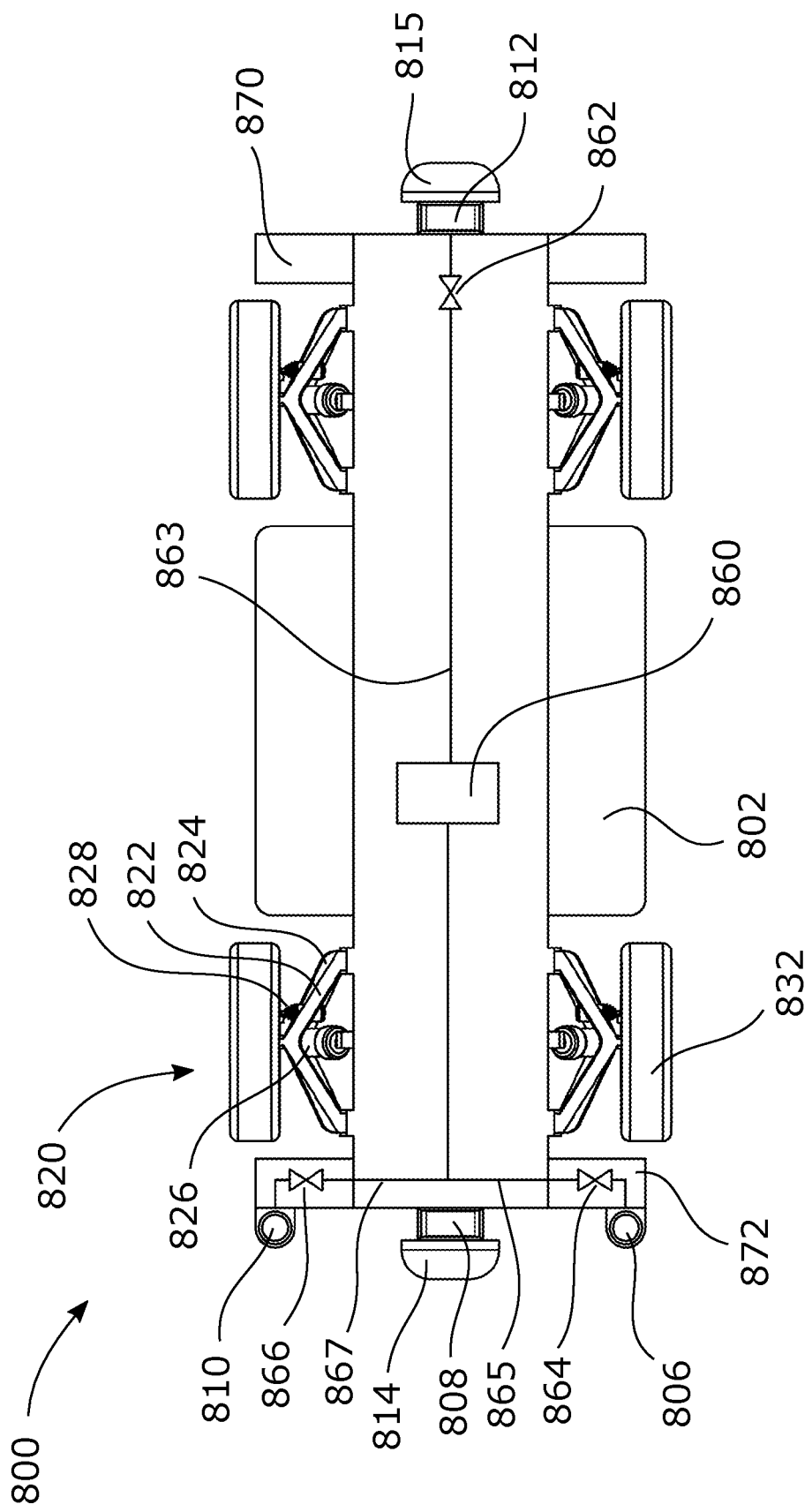
FIG. 16 is a top view of the vehicle in FIG. 15.

Shown in FIG. 15 and FIG. 16 is a vehicle 800 according to another embodiment. Vehicle 800 may include a frame member 802 which contains a battery (not shown), a suspension assembly 820, cabin assembly 840, cabin supports 806, 808, 810, and 812, a first sensing assembly 814, a second sensing assembly 815, an inertial measurement unit 816 fixed to the cabin assembly 840 configured to measure liner and angular accelerations and vehicle attitude with respect to the earth, four motor wheels and tires such as the motor wheel 830 and tire 832, a first bumper 870, and a second bumper 872. The exemplary suspension assembly 820 has an upper suspension linkage 822, lower suspension linkage 824, a suspension member 826 which contains a spring and a damper, and a steering actuator 828.

According to exemplary embodiments, the cabin assembly 840 may include of four attachment points 842, 844, 846, and 848 which permit the cabin assembly 840 to move substantially in roll, pitch, and heave motions relative to the frame member 802. In some embodiments, the attachment points 842, 844, 846, and 848 may include electronically controlled mechanisms to lock/unlock the supports 806, 808, 810, and 812 such that the cabin assembly 840 may be joined or separated with the rest of the vehicle 800. For example, one or more of the attachment points 842, 844, 846, and 848 may include at least one electrical connector that mates/matches/connects with at least one electrical connector on corresponding cabin supports and establishes electrical communication to the rest of the vehicle 800, which may include for example a battery. For example, the electrical connectors may mate/connect automatically when the corresponding attachment points mate/connect with the cabin supports. In some embodiments, the cabin assembly 840 may include overhead attachment points 807 and 809 that allows the cabin assembly 840 to attach to an aerial vehicle such as a vertical takeoff and landing vehicle. In another embodiment, the cabin assembly 840 may include attachment points to allow it to be removed from the rest of the vehicle 800 using for example a crane.

According to exemplary embodiments illustrated by FIG. 16, which shows the vehicle 800 without the cabin assembly 840 for clarity, the cabin supports 806, 810, and 812 may each contain an electromagnetic actuator and an elastic element that support the weight of the cabin assembly 840. The elastic elements may be an extensible and retractable cylinders of pressurized gas which are connected to a pump 860 configured to increase or decrease the amount of gas inside the cylinders to increase or decrease the heights of the cabin supports. Each of the cylinders of pressurized gas may have an electronically controlled valve such as valve 862 associated with cabin support 812, valve 866 associated with cabin support 810, and valve 864 associated with cabin support 806. Each of the valves may be connected to the pump 860 via gas hoses such as hoses 863, 865, and 867. According to a preferred embodiment, the valves 866, 864, and 862 may normally be in the closed position and all open when the pump 860 is operated to raise the height of the cabin assembly 840. The valves may also be opened and closed to only raise or lower a specific cabin support. Valves may also be opened in a specific pattern to reduce the attitude stiffness of the cabin 840 in a certain direction. For example, valves 866 and 864 may be opened while valve 862 is closed which allows the cabin 840 to achieve low roll stiffness. The low roll stiffness combined with activating electromagnetic actuators inside the cabin supports causes the cabin assembly 840 to rotate in roll with respect to frame member 802 with relatively low energy demand. The roll motion of the cabin assembly 840 is helpful for example before or during a vehicle lateral acceleration event such a vehicle turn or lane change to reduce the lateral acceleration experienced by the cabin. The electromagnetic actuators inside the cabin supports provide relatively fast-acting forces in parallel to the elastic elements that support the weight of the cabin assembly 840. The relatively fast-acting electromagnetic actuators may be beneficial during dynamic vehicle movements to reduce the lateral and longitudinal accelerations experienced by the cabin 840 as measured for example by the inertial measurement unit 816 and to reduce the vertical accelerations from road bumps and undulations. In one embodiment, the electromagnetic actuators inside the cabin supports may be configured to provide motion damping through regeneration which reduces the overall energy consumption. In one embodiment, the electromagnetic actuators inside the cabin supports may be controlled by a control unit which may use previewed road surface information gathered from for example the first sensing assembly 814 and second sensing assembly 815, and may move the cabin assembly 840 according to an estimated response based at least on a previously measured weight of the cabin assembly 840 or measurements from the inertial measurement unit 816.

The vehicle 800 is advantageous in that the energy consumption of the active cabin control is reduced through the use of elastic elements to provide support for the weight of the cabin assembly 840. The centralized pump 860 permits height adjustments of the cabin supports to accommodate a varying weight of the cabin and its contents. Traditional active suspension systems which are known to be used in cars to also reduce cabin accelerations act on the unsprung mass of the vehicle which typically require a high bandwidth. By placing the acceleration attenuation between the cabin assembly 840 and the frame member 802, the bandwidth requirements for the actuators are reduced. Furthermore, the small number of attachments points between the cabin supports and the cabin assembly 840 can be used for example with the aid of electronically controlled locking mechanisms to more easily join and separate the cabin 840 from the rest of the vehicle and use a standardized vehicle platform with a variety of cabins. By placing crash structures such as bumper 870 and 872 on the vehicle frame 840, the structural requirements for the cabin assembly 840 is reduced.

In another embodiment, the suspension members such as suspension member 826 consist of a preload adjustment elastic member such as a gas cylinder attached to a pump and an electromagnetic actuator capable of providing extension or retraction forces. The electromagnetic actuators in the suspension members reduces the acceleration experienced by the cabin assembly 840.

The application of the application is not limited to carrying a single human occupant and may be applied to carrying more than one occupant or other types of payloads sensitive to undesirable accelerations such as off-road vehicles or ambulances. The vehicle may also have less than four such as two or three or more than four wheels. The exemplary embodiments show vehicles using wheels which contact solid ground attached to the various suspension and suspension control assemblies while in other embodiments other forms of vehicle support elements may be used instead of wheels such as skis on water and snow.

Accordingly, the present disclosure discloses an unmanned movable platform that may include one or more unmanned moveable vehicles that are capable of operating different modes. Under the following mode, the unmanned movable vehicles may use their vision sensors to follow the operator while using other sensors to collect environmental information to smartly avoid obstacles. Under the autonomous navigation mode, the unmanned movable vehicles may autonomously navigate along a pre-stored route to complete a predefined task, such as loading or discharging an inventory.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. For example, the steps in the methods of the present disclosure may not necessarily be operated altogether under the described order. The steps may also be partially operated, and/or operated under other combinations reasonably expected by one of ordinary skill in the art. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A vehicle, comprising;
a frame member;
a cabin, movable with respect to and independent from the frame member;
wheels;
at least one suspension between the wheels and the frame member;
an actuation device in connection with the cabin and configured to control at least an orientation of the cabin with respect to the frame member, wherein the motion of the actuation device depends at least in part on an estimated mass of the cabin and its contents;
a perception module comprising perception sensors and algorithm configured to at least identify road boundaries and obstacles in a vicinity of the vehicle; and
a planning module configured to plan a motion of a steering assembly using information from at least the perception module.

2. The vehicle of claim 1, wherein the planning module is configured to plan the motion of the actuation device using information from at least the perception module.

3. The vehicle of claim 1, wherein the actuation device adjusts a roll angle of the cabin to reduce a lateral acceleration measured at the cabin.

4. The vehicle of claim 1, wherein the actuation device adjusts a pitch angle of the cabin to reduce a longitudinal acceleration measured at the cabin.

5. The vehicle of claim 1, wherein the actuation device adjusts a heave motion of the cabin to reduce a vertical acceleration measured at the cabin.

6. The vehicle of claim 1, wherein the actuation device responds at least in part to a cabin orientation measurement.

7. The vehicle of claim 1, wherein the actuation device responds at least in part to a suspension travel measurement.

8. A vehicle, comprising;
a frame member;
a cabin, movable with respect to and independent from the frame member;
wheels;
at least one suspension between the wheels and the frame member;
an actuation device in connection with the cabin and configured to control at least an orientation of the cabin with respect to the frame member;
a perception module comprising perception sensors and algorithm configured to at least identify road boundaries and obstacles in a vicinity of the vehicle; and
a planning module configured to plan motion of a steering assembly using information from at least the perception module,
wherein the cabin is supported such that no electrical power is required to hold its static position.

9. A vehicle, comprising;
a frame member;
a cabin;
wheels, in which two or more wheels arranged with a lateral distance between at least some of the wheels;
wheel height actuation assembly configured to control a height between the wheels and the frame member;
steering actuator other than the wheel height actuation assembly to steer a motion direction of the vehicle;
a perception module comprising perception sensors and algorithm configured to at least identify road boundaries and obstacles in a vicinity of the vehicle;
a planning module configured to plan at least a lateral motion of the vehicle using information from at least the perception module;
wherein a motion of the steering actuators steering the vehicle is in an opposite direction as a steering effect from a motion of the wheel height actuation assembly during a planned lateral motion of the vehicle.

10. The vehicle of claim 9, wherein the steering actuator opposes the steering effect from the motion of the wheel height actuation assembly during an initial portion of the lateral motion of the vehicle.

11. The vehicle of claim 10, wherein the steering actuator aids the steering effect from the motion of the wheel height actuation assembly during a subsequent portion of the lateral motion of the vehicle.

12. The vehicle of claim 9, further comprising an actuation device configured to move the cabin with respect to the frame member.

13. The vehicle of claim 12, the cabin according to at least a motion of the wheels with respect to the frame member.

14. The vehicle of claim 9, wherein the wheel height actuation assembly adjusts a roll angle of the cabin to reduce a lateral acceleration measured at the cabin.

15. The vehicle of claim 9, wherein the wheel height actuation assembly adjusts a pitch angle of the cabin to reduce a longitudinal acceleration measured at the cabin.

16. The vehicle of claim 9, wherein the wheel height actuation assembly adjusts a heave motion of the cabin to reduce a vertical acceleration measured at the cabin.

17. The vehicle of claim 9, wherein the motion of the wheel height actuation assembly depends at least in part on an estimated mass of the vehicle.

18. The vehicle of claim 9, wherein the motion of the steering actuator depends at least in part on the estimated mass of the vehicle.

19. The vehicle of claim 9, wherein the cabin is attached to the frame member via compliant mounts.

\* \* \* \* \*